(12) United States Patent
Heishi et al.

(10) Patent No.: US 11,671,549 B2
(45) Date of Patent: Jun. 6, 2023

(54) IMAGE READING DEVICE AND IMAGE FORMING APPARATUS FOR CORRECTING A READ IMAGE

(71) Applicants: Fumiyuki Heishi, Kanagawa (JP); Hiroshi Kubo, Kanagawa (JP); Shinya Kitaoka, Kanagawa (JP); Satoshi Saito, Kanagawa (JP); Yoshito Suzuki, Chiba (JP); Kimiharu Yanagisawa, Tokyo (JP); Atsushi Kanaya, Kanagawa (JP)

(72) Inventors: Fumiyuki Heishi, Kanagawa (JP); Hiroshi Kubo, Kanagawa (JP); Shinya Kitaoka, Kanagawa (JP); Satoshi Saito, Kanagawa (JP); Yoshito Suzuki, Chiba (JP); Kimiharu Yanagisawa, Tokyo (JP); Atsushi Kanaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/458,860

(22) Filed: Aug. 27, 2021

(65) Prior Publication Data
US 2022/0094815 A1 Mar. 24, 2022

(30) Foreign Application Priority Data
Sep. 23, 2020 (JP) .............................. JP2020-158878

(51) Int. Cl.
*H04N 1/60* (2006.01)
*H04N 1/00* (2006.01)

(52) U.S. Cl.
CPC ....... *H04N 1/6044* (2013.01); *H04N 1/00588* (2013.01); *H04N 1/00806* (2013.01)

(58) Field of Classification Search
CPC .... H04N 1/6044; H04N 1/60; H04N 1/00588; H04N 1/00806; H04N 1/125
(Continued)

(56) References Cited

U.S. PATENT DOCUMENTS

| 6,137,597 A | 10/2000 | Kanaya |
| 2004/0179242 A1* | 9/2004 | Nakaya ................ H04N 1/4076 358/1.9 |

(Continued)

FOREIGN PATENT DOCUMENTS

| JP | 9-107438 | 4/1997 |
| JP | 2009-272682 | 11/2009 |

(Continued)

*Primary Examiner* — Jamares Q Washington
(74) *Attorney, Agent, or Firm* — Harness, Dickey & Pierce, P.L.C.

(57) ABSTRACT

An image reading device and an image forming apparatus. The image reading device includes an image reader to read an image of a document, and a color reference component arranged to face the image reader. In the image reading device, the image reader reads the color reference component at a prescribed timing to obtain color reference image data, and correction data generating processes are executed based on the obtained color reference image data to generate correction data used to correct data of the image read by the image reader. In the image reading device, wherein the color reference component is moved relative to the image reader in a direction orthogonal to a direction toward and away from the image reader. The image forming apparatus includes the image reading device, and an image is formed on a recording material based on data of the image read by the image reading device.

20 Claims, 11 Drawing Sheets

(58) Field of Classification Search
USPC ............ 358/1.12, 1.14, 1.18, 504, 516, 518
See application file for complete search history.

(56) References Cited

U.S. PATENT DOCUMENTS

| | | |
|---|---|---|
| 2010/0027081 A1 | 2/2010 | Sano et al. |
| 2010/0225983 A1 | 9/2010 | Fujii et al. |
| 2011/0261413 A1* | 10/2011 | Ando ........................ B41J 2/32 |
| | | 358/3.26 |
| 2012/0002252 A1 | 1/2012 | Kubo et al. |
| 2012/0013955 A1 | 1/2012 | Ikeda |
| 2012/0057212 A1 | 3/2012 | Tobinaga et al. |
| 2012/0314267 A1 | 12/2012 | Suzuki et al. |
| 2013/0215481 A1 | 8/2013 | Hayasaka et al. |
| 2013/0242359 A1 | 9/2013 | Heishi et al. |
| 2014/0177012 A1 | 6/2014 | Kubo et al. |
| 2015/0256701 A1 | 9/2015 | Kimura et al. |
| 2016/0198059 A1 | 7/2016 | Kubo et al. |
| 2020/0137262 A1 | 4/2020 | Kubo et al. |
| 2020/0296255 A1 | 9/2020 | Hashimoto et al. |

FOREIGN PATENT DOCUMENTS

| | | |
|---|---|---|
| JP | 2011-130288 | 6/2011 |
| JP | 2012-023696 | 2/2012 |

* cited by examiner

FIG. 6A1
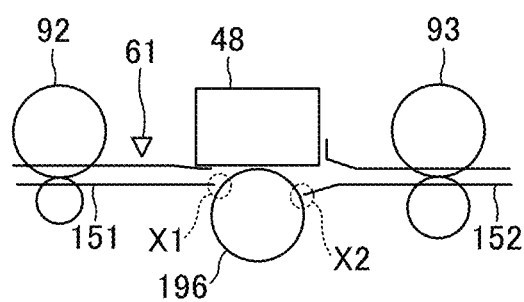
FIG. 6A2
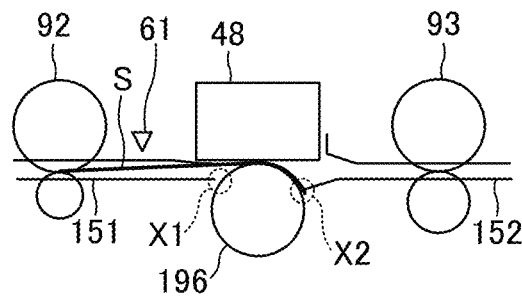
FIG. 6B1
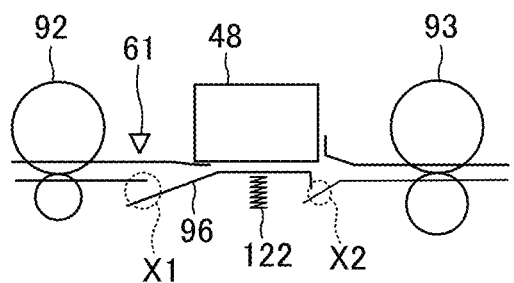
FIG. 6B2
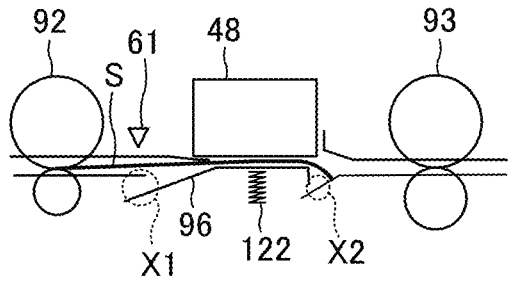

IMAGE READING DEVICE AND IMAGE FORMING APPARATUS FOR CORRECTING A READ IMAGE

CROSS-REFERENCE TO RELATED APPLICATION

This patent application is based on and claims priority pursuant to 35 U.S.C. § 119(a) to Japanese Patent Application No. 2020-158878, filed on Sep. 23, 2020, in the Japan Patent Office, the entire disclosure of which is hereby incorporated by reference herein.

BACKGROUND

Technical Field

Embodiments of the present disclosure relate to an image reading device and an image forming apparatus.

Background Art

In the related art, image reading devices each of which includes an image reading unit that reads an image on a document and a color reference component arranged so as to face the image reading unit are known in the art. In such image reading devices, the image reading unit reads the color reference component at a prescribed timing to obtain color reference image data, and correction data generating processes are executed based on the obtained color reference image data to generate correction data used to correct data of the image read by the image reading unit In the above image reading devices known in the art, pressing rollers used to pressurize the conveyed document against the image reading unit are provided on both sides of a white reference plate that serves as a color reference component in the direction of conveyance of the document.

SUMMARY

Embodiments of the present disclosure described herein provide an image reading device and an image forming apparatus. The image reading device includes an image reader to read an image of a document, and a color reference component arranged to face the image reader. In the image reading device, the image reader reads the color reference component at a prescribed timing to obtain color reference image data, and correction data generating processes are executed based on the obtained color reference image data to generate correction data used to correct data of the image read by the image reader. In the image reading device, wherein the color reference component is moved relative to the image reader in a direction orthogonal to a direction toward and away from the image reader. The image forming apparatus includes the image reading device, and an image is formed on a recording material based on data of the image read by the image reading device.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 6A1, FIG. 6A2, FIG. 6B1, and FIG. 6B2 are diagrams illustrating how a document is conveyed when the color reference component of FIG. 5A and FIG. 5B is a white reference roller and how a document is conveyed according to an embodiment of the present disclosure.

Figure 1:
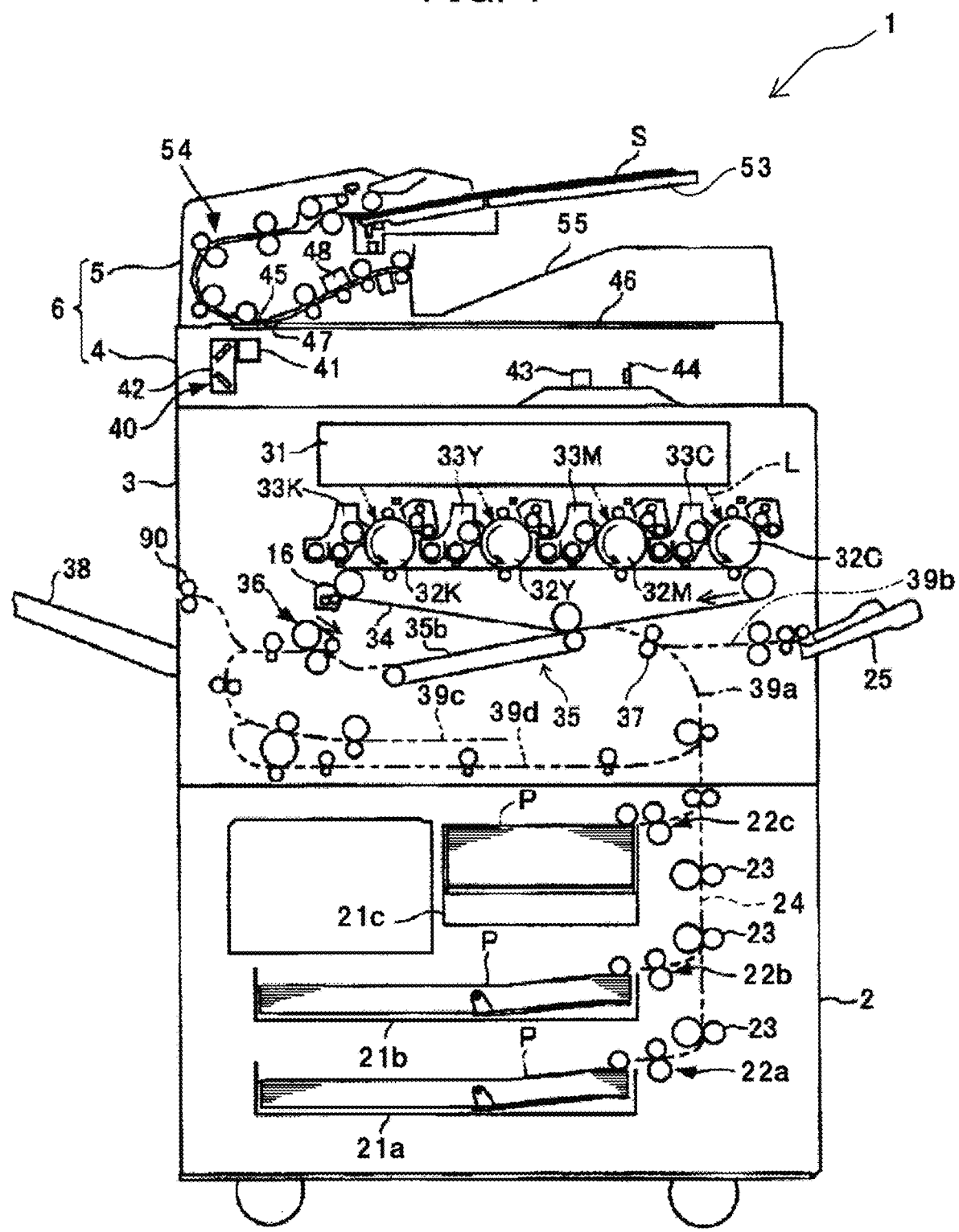
FIG. 1 is a schematic diagram illustrating a copier according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image reading device according to an embodiment of the present disclosure that is applied to an electrophotographic copier 1 that serves as an image forming apparatus is described below. Firstly, a basic configuration of the copier 1 according to an embodiment of the present disclosure is described.

FIG. 1 is a schematic diagram illustrating the copier 1 according to the present embodiment.

The copier 1 according to the present embodiment is provided with an image forming device 3, a transfer-sheet feeder 2, and a document conveyance and scanning unit 6. The document conveyance and scanning unit 6 according to the present embodiment is provided with a scanner 4 and an automatic document feeder (ADF) 5. The scanner 4 serves as a document reading device, and is fixed onto the image forming device 3. The ADF 5 serves as a sheet conveyance device, and is supported by the scanner 4.

The transfer-sheet feeder 2 includes a plurality of transfer-sheet trays 21a, 21b, and 21c in multiple stages. Each of the transfer-sheet trays 21a, 21b, and 21c can accommodate a plurality of cut-sheet transfer sheets P as a bundle of sheets stacked in layer. Each one of the multiple sheet trays 21a, 21b, and 21c accommodates the transfer sheets P such as white sheets of paper either in a vertical or horizontal sheet feeding direction. The size of transfer sheet P to be used is selected in advance from multiple sheet sizes. The transfer-sheet feeder 2 is provided with a plurality of transfer-sheet feed units 22a, 22b, and 22c each of which picks up and separately feed an uppermost one of the transfer sheets P stored in one of the multiple transfer-sheet trays 21a, 21b, and 21c on a one-sheet-by-one-sheet basis. Further, the transfer-sheet feeder 2 is provided with, for example, various types of conveyance rollers 23, and these conveyance rollers 23 makes up a transfer-sheet feeding path 24 through which the transfer sheet P fed by each one of the transfer-sheet feed units 22A, 22B, and 22C to a prescribed position at which an image is formed by the image forming device 3.

The image forming device 3 according to the present embodiment is provided with an exposure device 31 that serves as a latent image forming unit, and a plurality of drum-shaped photoconductors 32K, 32Y, 32M, and 32C each of which serves as a latent-image bearer. Moreover, the image forming device 3 according to the present embodiment is provided with a plurality of developing devices 33K, 33Y, 33M, and 33C that are filled with black color toner (K), yellow color toner (Y), magenta color toner (M), and cyan color toner (C), respectively. The image forming device 3 according to the present embodiment is provided with an intermediate transfer belt 34 that serves as an intermediate transferor, a secondary transfer device 35 that transfers the toner image on the intermediate transfer belt 34 onto the transfer sheet P. and a fixing device 36 that fixes the toner image on the transfer sheet P onto which the toner image has been transferred.

For example, the exposure device 31 generates laser beams L of each color to be used for exposure based on the image read by the scanner 4. The exposure device 31 exposes the photoconductors 32K, 32Y, 32M, and 32C of each color to the laser beams L. As a result, electrostatic latent images that correspond to the read image are formed on the surface layers of the photoconductors 32K. 32Y, 32M, and 32C.

The developing devices 33K, 33Y, 33M, and 33C bring toner in thin layer close to the photoconductors 32K, 32Y, 32M, and 32C that face the developing devices 33K, 33Y, 33M, and 33C, respectively. As a result, the electrostatic latent images on the surfaces of the photoconductors 32K, 32Y, 32M, and 32C are supplied with toner, and are made visible. In the image forming device 3 according to the present embodiment, the toner images that are developed on the photoconductors 32K. 32Y, 32M, and 32C are superimposed on top of one another on the intermediate transfer belt 34. Such procedure is referred to as primary transfer. As a result, a color toner image is formed on the intermediate transfer belt 34. The color toner image is secondarily transferred from the intermediate transfer belt 34 to the transfer sheet P at a secondary transfer nip where a transfer and conveyance belt 35b of the secondary transfer device 35 disposed below the intermediate transfer belt 34 contacts the intermediate transfer belt 34. The color toner image that has been transferred onto the transfer paper P is conveyed to the fixing device 36 by the transfer and conveyance belt 35b of the secondary transfer device 35. The color toner image on the transfer paper P is melted as heated and pressurized by the fixing device 36. As a result, the color toner image is fixed on the transfer paper P, and the color image is recorded on the transfer paper P.

The image forming device 3 according to the present embodiment has a transfer-sheet conveyance path 39a through which the transfer sheet P that is conveyed from the transfer-sheet feeder 2 through the transfer-sheet feeding path 24 is conveyed toward the secondary transfer nip. In the transfer-sheet conveyance path 39a, firstly, a pair of registration rollers 37 adjust the timing at which the transfer sheet P is conveyed and the conveyance speed of the transfer sheet P. Then, the transfer sheet P passes the secondary transfer nip and the fixing device 36 in synchronization with the speed of the intermediate transfer belt 34 and the transfer and conveyance belt 35, and then is ejected to an output tray 38 by an output roller pair 90.

The image forming device 3 has a bypass transfer-sheet feeding path 39b through which the transfer sheet P placed on a manual bypass tray 25 is fed into the transfer-sheet conveyance path 39A upstream from the registration roller pair 37 in the sheet conveying direction.

A switchback conveyance path 39c and a reverse conveyance path 39d are located below the secondary transfer device 35 and the fixing device 36. Each of the switchback conveyance path 39c and the reverse conveyance path 39d is defined by, for example, a plurality of conveyance rollers and conveyance guides.

In duplex printing in which images are formed on both sides of a transfer sheet P, switchback conveying operation is performed through the switchback conveyance path 39c. In the switchback conveying operation, the transfer sheet P on which an image has been fixed on one side enters from one end of the device that is on the left side of the image forming device 3 as illustrated in FIG. 1, and then is moved in a reverse direction opposite to the direction in which the transfer sheet P entered. After the switchback conveying operation is performed through the switchback conveyance path 39c, the front and back sides of the transfer sheet P are reversed in the reverse conveyance path 39d, and the transfer sheet P is again fed to the registration roller pair 37.

In other words, the direction of travel of the transfer sheet P on which an image has been fixed on one side is reversed through the switchback conveyance path 39c, and then the front and back sides of the transfer sheet P are reversed in the reverse conveyance path 39d and the transfer sheet P enters the secondary transfer nip again. After the secondary transfer operation of the image and the image fixing operation to the other surface of the transfer sheet P are finished, the transfer sheet P is ejected to the output tray 38.

The scanner 4 according to the present embodiment includes a first carriage 41 provided with an illumination unit and a mirror unit, a second carriage 42 provided with a mirror unit, an imaging lens 43, an imaging device 44, and a first contact glass 45. Further, the scanner 4 according to the present embodiment is provided with a second contact glass 46 on which the document S is placed and a protruding portion 47 that pushes up and adjusts the relative positions of one side of the document S. The first carriage 41, the second carriage 42, the imaging lens 43, the imaging device 44 that are arranged inside the scanner 4 together serves as a first-face reader 40 and read the image on the first face of the document S conveyed onto the first contact glass 45. The term "first face" used in the present embodiment refers to one side of the document S that conveyed in an automatic manner. For example, the first face indicates the surface of the image on the front side.

The first carriage 41 is arranged below the first contact glass 45 and the second contact glass 46 in a movable manner in the right and left directions in FIG. 1. In other words, the position of the first carriage 41 is controllable. The illumination light from a light source provided for the illumination unit is reflected by a mirror unit such that the surface to be exposed of the document S will be irradiated with the reflected illumination light.

The reflected light reflected by the exposure surface of the document S enters the imaging lens 43 via the respective mirror units mounted on the first carriage 41 and the second carriage 42, is imaged by the imaging lens 43, and the imaged image is read by the imaging device 44.

The scanner 4 exposes and scans the image surface of the document S placed on the second contact glass 46. During such operation, the light source is turned on, and the first carriage 41 and the second carriage 42 are being moved at a speed ratio of, for example, "2:1." More specifically, the scanner 4 uses the imaging device 44 to read the image of the document S by during the above exposing and scanning operation. As described above, the scanner 4 has a function to scan fixed documents, and serves as a so-called flatbed scanner.

The scanner 4 according to the present embodiment stops the first carriage 41 at a fixed position directly below the first contact glass 45. Then, the scanner 4 scans the image on the first face of the document S that is being conveyed in an automatic manner without moving the light source or an optical system consisting of, for example, a reflection mirror. As described above, the scanner 4 has a function to scan moving documents, and serves as a so-called document feeder (DF) scanner.

Further, the copier 1 according to the present embodiment is provided with a second-face reader 48 incorporated into the ADF 5 in addition to the first-face reader 40 provided for the scanner 4. The second-face reader 48 scans the second face of the document S that has passed through the first contact glass 45. For example, the second-face reader 48 scan the surface of the image on the rear side of the document S.

The ADF 5 is coupled to the scanner 4, which is arranged above the image forming device 3 of the copier 1, through a hinge mechanism in an openable and closable manner. The ADF 5 is operated to rotate or turn between an open position at which the first contact glass 45 and the second contact glass 46 of the scanner 4 are exposed and a closed position at which the first contact glass 45 and the second contact glass 46 are covered.

The ADF 5 is described below.

Figure 2:
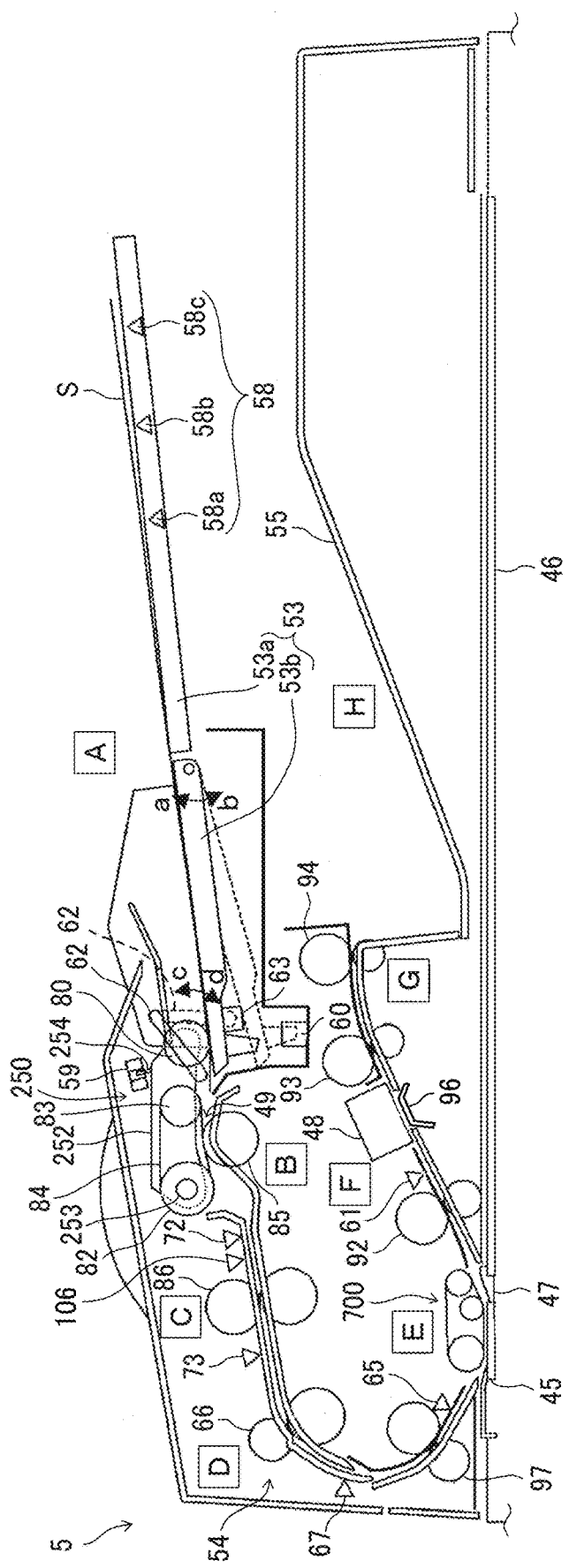
FIG. 2 is a magnified schematic diagram of a configuration or structure of an automatic document feeder and an upper portion of a scanner, according to an embodiment of the present disclosure.

FIG. 2 is a magnified schematic diagram of a configuration or structure of the ADF 5 and an upper portion of the scanner 4, according to the present embodiment.

The ADF 5 according to the present embodiment includes, for example, a document setting part A, a sheet separating and feeding part B, a registration part C, a turning part D, a first reading and conveying part E, a second reading and conveying part F, a sheet ejection unit G, and a sheet stacking part H. A document conveyance unit 54 of the ADF 5 according to the present embodiment configures a path through which a document S is conveyed from a position detected by a contact sensor 72 arranged downstream in the separation and feeding unit B to a reading entrance roller pair 97.

The document conveyance and scanning unit 6 that is provided with the ADF 5 scans an image while the document S, which is a recording medium to be read, is being conveyed through the first-face reader 40 and the second-face reader 48, which are fixed reading devices, at a desired speed.

The document setting part A has a document table 53 on which a bundle of documents S is set such that the primary side of each document S face upward. The sheet separating and feeding part B includes, for example, a pickup roller 80, a separation belt 84, and a reverse roller 85. The sheet separating and feeding part B separates and feeds the documents S on a one-piece-by-one-piece basis from the bundle of documents S set on the document table 53. The registration part C has a function of temporarily contacting and aligning the document S fed from the sheet separating and feeding part B. and a function of drawing out and conveying the aligned document S. The turning part D has a conveyance path curved in a C-shape, and turns the document S conveyed in the conveyance path such that the document S is reversed upside down. As a result, the document S is conveyed such that the first face of the document S will face the first-face reader 40 arranged below as illustrated in FIG. 1.

The first reading and conveying part E has a first contact glass 45 composed of platen glass, and the document S is conveyed above the first contact glass 45. While the document S is being conveyed, the first face of the document S is scanned from below the first contact glass 45 by the first-face reader 40 arranged inside the scanner 4.

In the second reading and conveying part F, the document S that has passed the scanning position of the first-face reader 40 is guided with a white reference guide plate 96 that serves as a color reference component, and the second face of the document S is read by the second-face reader 48.

In the sheet ejection unit, the document S that has passed the scanning position of the first-face reader 40 and the scanning position of the second-face reader 48 is ejected to the sheet stacking part H. In the sheet stacking part H, the document S whose images have been read is stacked and stored on a document stacker 55.

Figure 3:
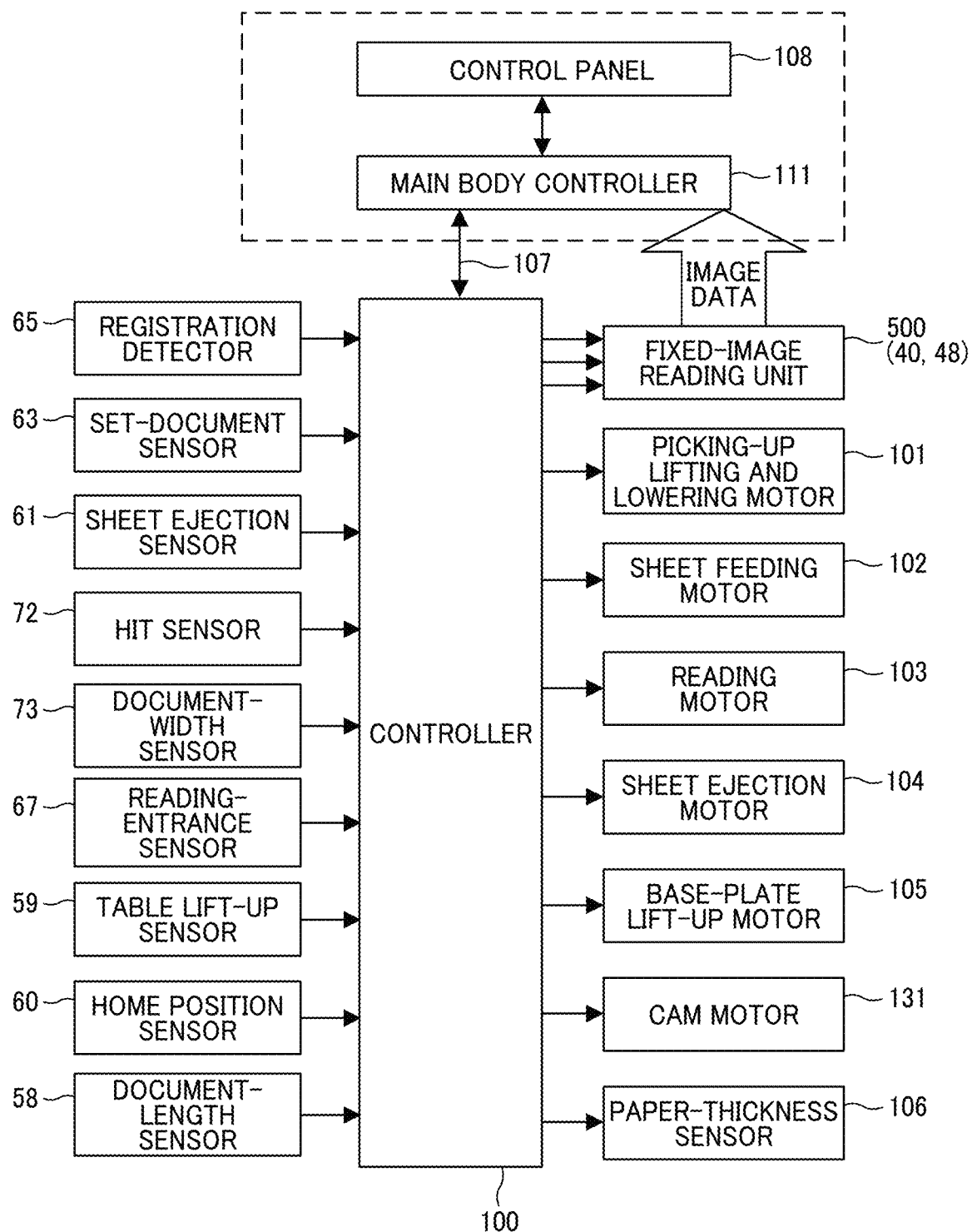
FIG. 3 is a block diagram of how an automatic document feeder (ADF) is controlled in its entirety, according to an embodiment of the present disclosure.

FIG. 3 is a block diagram of how the ADF 5 is controlled in its entirety, according to the present embodiment. A controller 100 of the ADF 5 controls a series of operations of, for example, multiple motors, various types of sensors, and a fixed image reading unit 500. The multiple motors include a picking-up lifting and lowering motor 101, a sheet feeding motor 102, a reading motor 103, a sheet ejection motor 104, and a base-plate lift-up motor 105, and serve as drivers that drive the conveying operation of the document S. The fixed image reading unit 500 is the first-face reader 40 or the second-face reader 48.

Figure 4:
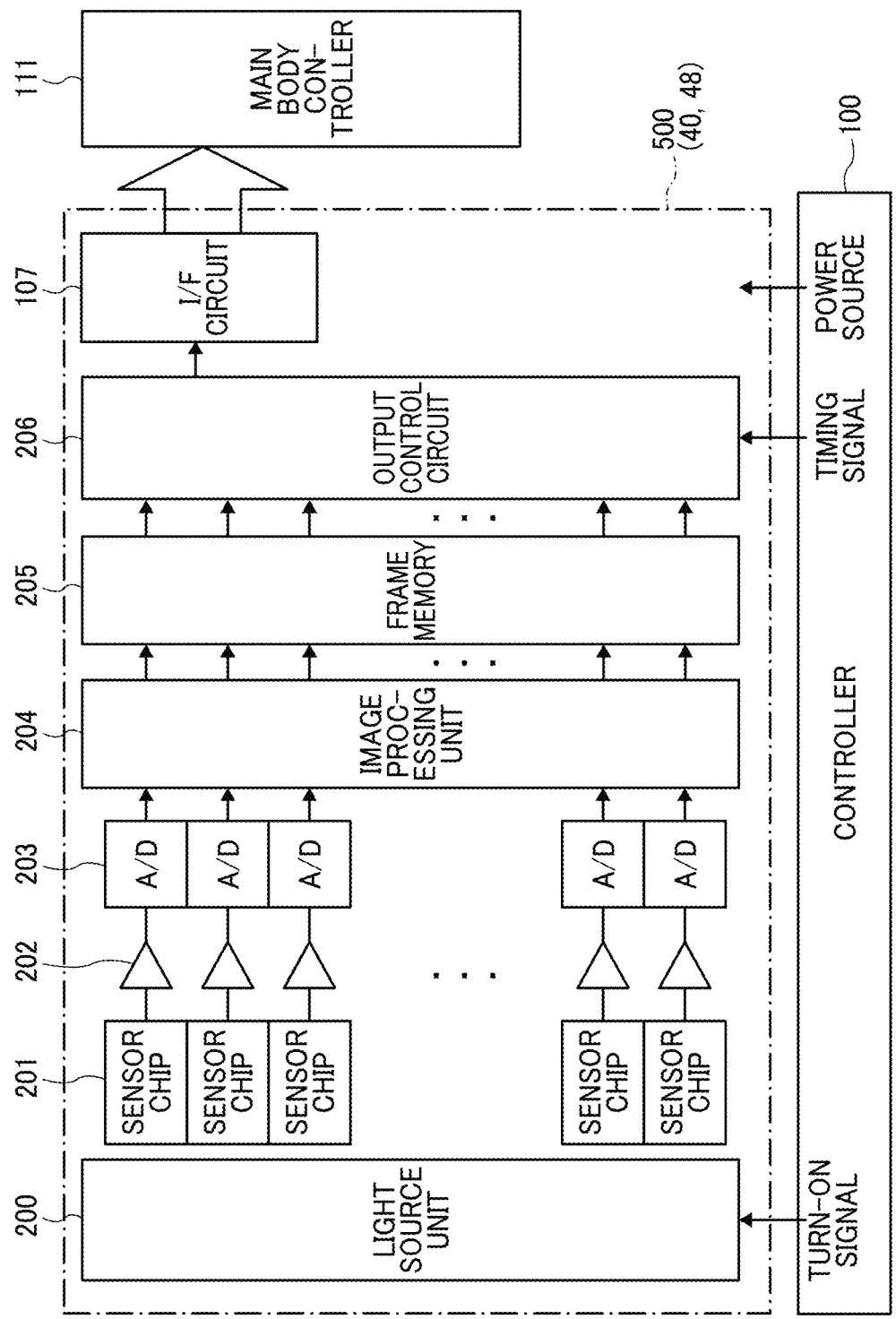
FIG. 4 is a block diagram illustrating a relevant part of an electric circuit of a fixed image reading unit according to an embodiment of the present disclosure.

FIG. 4 is a block diagram illustrating a relevant part of an electric circuit of the fixed image reading unit 500 according to the present embodiment.

The fixed image reading unit 500 includes, for example, a light source unit 200, a plurality of sensor chips 201, an image processing unit 204, a frame memory 205, an output control circuit 206, and an interface circuit 107.

The light source unit 200 according to the present embodiment includes, for example, a light-emitting diode (LED) array, a fluorescent lamp, or a cold-cathode tube. A plurality of sensor chips 201 are arrayed in the main scanning direction that corresponds to the width direction of the document S. The multiple sensor chips 201 are coupled to a plurality of operational (OP) amplifiers 202 on a one-by-one basis. The multiple OP amplifiers 202 are coupled to a plurality of analog-to-digital converters 203 on a one-by-one basis.

Each of the multiple sensor chips 201 includes a condenser lens and a photoelectric conversion element called unity-magnification contacting image sensor. Before the document S enters the scanning position of the fixed image reading unit 500, a turn-on signal is sent from the controller 100 to the light source unit 200. As a result, the light source unit 200 is turned on, and the light is emitted to the front side of the document S. More specifically, the light is emitted to the first face when an image is read by the first-face reader 40, and the light is emitted to the second face when an image is read by the second-face reader 48. The light that is reflected by a surface of the document S is concentrated by the condenser lens of each one of the multiple sensor chips 201 onto the photoelectric conversion element and, is read as image data by the multiple sensor chips 201. The image data that is read by each of the sensor chips 201 is amplified by each one of the multiple OP amplifiers 202, and then is digitized and converted into image data by each one of the A/D converters 203.

The image data as obtained above is input to the image processing unit 204, and for example, shading correction is performed on the image data. Then, the image data on which the shading correction has been performed is temporarily stored in the frame memory 205. Then, the output control circuit 206 converts the image data into data in the file format that can be received by the main body controller 111, and the image data is output to the main body controller 111 through the interface circuit 107. Note that the main body controller 11 is the controller provided for the main body of the copier 1. The controller 100 outputs, for example, a timing signal that indicates a timing at which the front end of the document S reaches the scanning position of the fixed image reading unit 500, and a turn-on signal for the light source, and the power for the light source. The timing signal that indicates a timing at which the front end of the document S reaches the scanning position of the fixed image reading unit 500 is used to determine that the image data obtained after that timing is valid data.

The bundle of documents S to be read whose first faces are set face up are placed on the document table 53. The document table 53 is composed of a movable document table 53*b* that supports the front end of the document S and is pivotable in the directions indicated by arrows a-b in FIG. 2 depending on the thicknesses of a bundle of the documents S, and a fixed document table 53*a* that supports the rear end of the document S.

The document table 53 is provided with side guides that contact both ends of the document S in the width direction orthogonal to the direction in which the document S is conveyed. In other words, the width direction is orthogonal to the drawing of FIG. 2. When the document S is set on the document table 53, the side guides contact both ends of the document S in the width direction, and the relative positions of the document S are adjusted in the width direction.

Above the movable document table 53*b*, a set feeler 62 that is a lever is arranged in a pivotable manner. When the document S is not set on the document table 53, the set feeler 62 is located at a position indicated by a broken line in FIG. 2. This position corresponds to a detecting position by a set-document sensor 63. As the set-document sensor 63 detects the set feeler 62, it is understood that the document S is not set on the document table 53.

When the document S is set on the document table 53, the front end of the document S pushes up the set feeler 62. Accordingly, the set feeler 62 moves away from a detecting position of the set-document sensor 63, and the set-document sensor 63 no longer detects the set feeler 62. As a result, it is detected that the document S is set. Then, the set-document sensor 63 sends a detection signal to the controller 100. The detection signal is sent from the controller 100 to the main body controller 111 of the document conveyance and scanning unit 6 through the interface circuit 107.

On the fixed document table 53*a*, a plurality of document length sensors 58 (58*a*, 58*b*, and 58*c*) are arranged, each of which is composed of a reflective photosensor used to detect the length of the document S in the conveyance direction or an actuator-type sensor by which even a single document is detectable. The length of the document S in the conveyance direction is approximately determined by these document length sensors. These multiple document length sensors 58 need to be arranged so as to be able to determine at least whether the document of the same size is vertically set or horizontally set.

A pickup roller 80 is arranged above the movable document table 53*b*. The pickup roller 80 is rotates as driven by the sheet feeding motor 102. The separation belt 84 and the reverse roller 85 that together configure a separation nip that serves as a separator rotate as driven by the sheet feeding motor 102.

The movable document table 53*b* pivots in the direction of arrow a-b in FIG. 2 by the cam mechanism driven by the base-plate lift-up motor 105. When the set feeler 62 and the set-document sensor 63 detect that the document S is set on the document table 53, the controller 100 rotates the base-plate lift-up motor 105 in forward direction. As the base-plate lift-up motor 105 rotates in forward direction, the movable document table 53*b* rotates in the direction as indicated by arrow a in FIG. 2, and the free end of the movable document table 53*b* on the left side of FIG. 2 rises. The bundle of documents S set on the document table 53 is also lifted together with the free end of the movable document table 53*b*, and the uppermost surface of the bundle of documents S comes into contact with the pickup roller 80.

The pickup roller 80 is rotatably supported at one end of the pickup bracket 252 on the right of FIG. 2. The pickup bracket 252 is rotatable in the direction as indicated by arrows c and d in FIG. 2 about a sheet feeder unit drive shaft 253 on the other end of the pickup bracket 252 on the left end in FIG. 2. The pickup bracket 252 is rotated in the direction as indicated by arrows c-d in FIG. 2 by a cam mechanism driven by a picking-up lifting and lowering motor 101. Then, as the pickup bracket 252 rotates in the direction as indicated by arrow c-d in FIG. 2, the pickup roller 80 moves in the direction as indicated by arrow c-d in FIG. 2. The pickup bracket 252 that supports the pickup roller 80 includes a bracket includes a to-be-detected portion of bracket 254. Further, above the pickup bracket 252, a table lift-up sensor 59 is arranged on the frame of the main body of the ADF 5.

The table lift-up sensor 59 detects the presence or absence of the to-be-detected portion of bracket 254 at the detecting position to determine whether or not the pickup roller 80 is at the lifted position. Moreover, the table lift-up sensor 59 is a light transmission type optical sensor detects whether or not light emitted from a light emitter is blocked at a detecting position between the light emitter and a light receiver. Then, the to-be-detected portion of bracket 254 blocks light at the detecting position to detect that the to-be-detected portion of bracket 254 is present at the detecting position of the table lift-up sensor 59.

Once the movable document table 53b is lifted and the pickup roller 80 is pressed by the top face of the document S on the movable document table 53b from a state in which the pickup roller 80 rotates in the direction as indicated by arrow d in FIG. 2 and the movable document table 53b is moved downward, the pickup roller 80 rotates in the direction as indicated by arrow c in FIG. 2 and is lifted. As such a condition is detected by the table lift-up sensor 59, it is possible to detect that the movable document table 53b has been lifted to the upper limit. Once it is detected that the movable document table 53b has been lifted to the upper limit, the picking-up lifting and lowering motor 101 and the base-plate lift-up motor 105 stop moving, and the document S is sandwiched between the movable document table 53b and the pickup roller 80.

The table lift-up sensor 59 detects that the base plate is lifted to the upper limit to detect that the upper surface of the bundle of the documents S is maintained at an appropriate height for sheet feeding. When the table lift-up sensor 59 is turned on to detect the to-be-detected portion of bracket 254, the lifting of the movable document table 53b that serves as a base plate is stopped, and the sheet feeding is repeated. As the paper feeding is repeated, the position of the top face of the bundle of documents S goes down. Once the detection by the table lift-up sensor 59 is turned off, control is repeated so that the movable document table 53b is lifted and the table lift-up sensor 59 is turned on again. Due to such control performed in a repeated manner, the position of the top face of the bundle of documents S can always be maintained at an appropriate height for paper feeding.

Once all the documents S set on the document table 53 are fed, the base-plate lift-up motor 105 is reversely driven to lower the movable document table 53b to a home position where the next bundle of documents S can be set. Once the movable document table 53b is lowered to the home position, a home position sensor 60 detects a feeler disposed at the lower part of the movable document table 53b.

In the present embodiment, both the movable document table 53b and the pickup roller 80 are provided with an elevating mechanism. However, no limitation is indicated thereby, and only one of the movable document table 53b and the pickup roller 80 may be provided with an elevating mechanism in the mechanism for holding the document S.

After a double-sided reading mode or a single-sided reading mode is selected, and the document S is set on the document table 53. Then, a copy start key on the control panel 108 is touched or pressed down. When the copy start key is touched or pressed down, a sheet feeding signal is sent from the main body controller 111 to the controller 100 of the ADF 5 through the interface circuit 107. Due to such a configuration, the sheet feeding motor 102 is driven to rotate in forward direction. As the sheet feeding motor 102 is driven to rotate in forward direction, the pickup roller 80 is driven to rotate, and a few documents S on the document table 53 are picked up. Ideally, a single document S is to be picked up. In this configuration, the pickup roller 80 rotates in the direction so as to convey the uppermost document S of the bundle of documents S on the document table 53 toward a separation nip as will be described later in detail. In other words, the pickup roller 80 is driven to rotate in a clockwise direction in FIG. 2.

In the present embodiment, when the double-sided reading mode or the single-sided reading mode is set, all the documents S that are set on the document table 53 may be set in the same way. Alternatively, each one of the first to n-th documents S may be set in a different way. As the different setting, for example, the double-sided reading mode is set for the first and tenth documents S among all the ten documents S, and the single-sided reading mode is set for the other documents S.

The document S that is fed by the pickup roller 80 is fed to a separation entrance 49 of the separation nip at which the separation belt 84 contacts the reverse roller 85. The separation belt 84 is stretched between a sheet feeding drive roller 82 a sheet feeding driven roller 83, and is seamlessly moved in the sheet feeding direction, i.e., a clockwise direction in FIG. 2, as the sheet feeding drive roller 82 is driven to drive by the rotation of the sheet feeding motor 102 in forward direction.

A reverse roller 85 contacts a lower stretched surface of the separation belt 84. Accordingly, the reverse roller 85 is driven to rotate in a direction opposite to the sheet feeding direction, i.e., a clockwise direction in FIG. 2, by the forward rotation of the sheet feeding motor 102. As described above, the surface movement direction of the separation belt 84 at the separation nip is opposite to the surface movement direction of the reverse roller 85 at the separation nip. Due to such a configuration, the uppermost document S of the bundle of documents S and the document S below the uppermost document S are separated from each other, and only one uppermost document S can be fed.

More specifically, the surface of the separation belt 84 moves in the sheet feeding direction at the separation nip where the separation belt 84 contacts the reverse roller 85. On the other hand, the surface of the reverse roller 85 tends to move in the direction opposite to the sheet feeding direction. However, in order to deal with such a situation, the drive transmission portion of the reverse roller 85 is provided with a torque limiter. Accordingly, when the force acting on the surface of the reverse roller 85 in the sheet feeding direction is larger than the upper limit torque of the torque limiter, the reverse roller 85 rotates counterclockwise in FIG. 2 so as to move in the sheet feeding direction.

The reverse roller 85 is pressed against the separation belt 84 with a predetermined pressure. When the reverse roller 85 directly contacts the separation belt 84, the reverse roller 85 rotates together with the separation belt 84. When the reverse roller 85 contacts the separation belt 84 through one of the documents S and thus only one sheet of the document S is nipped in the separation nip, the reverse roller 85 rotates together with the document S. In other words, the reverse roller 85 rotates in a counterclockwise direction in FIG. 2, which is the sheet feeding direction.

On the other hand, when two or more documents S are nipped at the separation nip, the torque limiter is set so that the force of corotation is weaker than the upper limit torque of the torque limiter. Accordingly, the reverse roller 85 is driven to rotate in a clockwise direction in FIG. 2, which is the direction opposite to the direction of corotation. When the reverse roller 85 is driven to rotate in the direction opposite to the direction of corotation, the moving force in a direction opposite to the sheet feeding direction is applied by the reverse roller 85 to the documents S other than the uppermost document S among the documents S conveyed toward the separation nip. As a result, the excessive documents S are pushed back, and only the uppermost document S is separated from the multiple documents S. Due to this configuration, the documents S can be prevented from being fed erroneously in pair.

The document S that separated into one sheet by the action of the separation belt 84 and the reverse roller 85 enters the registration part C. Then, the document S is further fed by the separation belt 84, and the front end of the document S is detected by the contact sensor 72. Further, the front end of the document S abuts against the pull-out roller pair 86 that stops rotating. The sheet feeding motor 102 that is driven during the above operation keeps rotating for a predetermined length of time after the front end of the document S is detected by the contact sensor 72, and then stops rotating. Due to such a configuration, the document S is fed by a predetermined distance from the detecting position of the contact sensor 72. As a result, the document S is pressed against the pull-out roller pair 86 with a predetermined amount of deformation, and the conveyance of the document S by the separation belt 84 is stopped.

When the front end of the document S is detected by the contact sensor 72, a picking-up lifting and lowering motor 101 is rotated. Due to such a configuration, the pickup roller 80 is retracted from the upper surface of the document S, and the document S is fed only by the conveying force of the separation belt 84. Due to such a configuration, the front end of the document S enters the nip formed by the upper and lower rollers of the pull-out roller pair 86, and skew correction is performed to align the front end of the document S.

As described above, the pull-out roller pair 86 has a skew adjustment function and conveys the document S whose skew has been adjusted after separation to the intermediate roller pair 66. When the sheet feeding motor 102 is reversely driven, one of the two rollers of the pull-out roller pair 86 is driven to rotate to convey the document S. When the sheet feeding motor 102 is driven in reverse direction, the pull-out roller pair 86 and the intermediate roller pair 66 are driven to rotate, the pickup roller 80, the separation belt 84, and the reverse roller 85 are not driven to rotate. In other words, when the sheet feeding motor 102 is rotated in forward direction, the driving force is conveyed to the pickup roller 80, the separation belt 84, and the reverse roller 85. When the sheet feeding motor 102 is rotated in reverse direction, the driving force is conveyed to the pull-out roller pair 86 and the intermediate roller pair 66.

The document S that is fed by the pull-out roller pair 86 passes directly under the document-width sensor 73. The document width sensor 73 is a sensor in which a plurality of sheet sensors each including, for example, a reflective photosensor are arranged in a document width direction perpendicular to the drawing of FIG. 2. Then, the size of the document S in the width direction is detected based on which one of the sheet sensors detects the document S. The length of the document S in the conveyance direction is detected from a motor pulse based on the time difference between the timing when the front end of the document S is detected by the contact sensor 72 and the timing when the rear end of the documents has passed and the document S is no longer detected by the contact sensor 72.

The document S that is conveyed by the rotation of the pull-out roller pair 86 and the intermediate roller pair 66 enters the turning part D in which the intermediate roller pair 66 and the reading entrance roller pair 97 are driven to convey the document S.

In the automatic document feeder 5, when the document S is conveyed from the registration part C to the turning part D by the rotation of the pull-out roller pair 86 and the intermediate roller pair 66, the conveyance speed at the registration part C is set to be higher than the conveyance speed at the first reading and conveying part E. Due to such a configuration, the processing time for feeding the document S to the first reading and conveying part E is shortened.

When the front end of the document S is detected by the reading entrance sensor 67, deceleration of the sheet feeding motor 102 is started. In parallel with that, the reading motor 103 is driven to rotate in forward direction. As the reading motor 103 is driven to rotate in forward direction, each one of the reading entrance roller pair 97, a first reading exit roller pair 92, and a second reading exit roller pair 93 are driven to rotate in the conveyance direction. Decelerating the sheet feeding motor 102 slows down the rotation speed of the intermediate roller pair 66 that is driven to rotate by the sheet feeding motor 102. Due to such a configuration, before the front end of the document S enters the nip formed by the upper and lower rollers of the reading entrance roller pair 97, the conveyance speed of the document S is made equal to the conveyance speed in the first reading conveying portion E.

Once the front end of the document S that moves from the turning part D toward the first reading and conveying part E is detected by the registration detector 65, the controller 100 reduces the driving speed of each motor over a predetermined period of time. Due to such a configuration, the conveyance speed of the document S is reduced over a prescribed conveying distance. Then, the controller 100 performs control so as to stop the document S temporarily upstream from a first scanning position 700 at which the image on the first face of the document S is read by the first-face reader 40. Further, together with such control to stop the document S temporarily, the controller 100 sends a signal used to stop the registration roller pair 37 to the main body controller III through the interface circuit 107.

Subsequently, once the controller 100 receives a reading start signal from the main body controller 111, the controller 100 starts driving the reading motor 103. In so doing, the controller 100 controls operation of the reading motor 103 so that the conveyance speed of the document S rises to a predetermined conveyance speed before the front end of the document S stopped by the registration roller pair 37 reaches the first scanning position 700. Accordingly, the conveyance speed of the document S is increased, and the document S is conveyed toward the first scanning position 700.

Subsequently, the timing at which the front end of the document S calculated based on the pulse count of the reading motor 103 reaches the first scanning position 700 is detected. Then, when the timing is detected, a gate signal that indicates the effective image area in the sub-scanning direction of the first face of the document S is sent from the controller 100 to the main body controller 111. The transmission of the gate signal is continued until the rear end of the document S passes through the first scanning position 700, and the first face of the document S is read by the first-face reader 40.

As illustrated in FIG. 2, the top face of the protruding portion 47 is inclined so that the height of the left end side becomes lower. As a result, the front end of the document S that has passed through the first scanning position 700 is scooped up by the inclination of the protruding portion 47 and is guided toward the nip of the first reading exit roller pair 92.

The document S that has passed through the first reading and conveying part E passes through the nip of the first reading exit roller pair 92, and then the front end of the document S is detected by the sheet ejection sensor 61. Further, the document S is conveyed to and passes through the second first reading and conveying part F, and then is conveyed to the sheet ejection unit G.

In the single-sided reading mode in which only one side of the document S. i.e., the first face of the document S, is to be read, the second face of the document S does not need to be read by the second-face reader 48. Once the front end of the document S is detected by the sheet ejection sensor 61, the sheet ejection motor 104 starts rotating in forward direction, and the upper one of the two rollers of the document output roller pair 94 is rotated counterclockwise as in FIG. 2.

The timing at which the rear end of the document S passes through the nip of the document output roller pair 94 is computed based on the pulse count of the sheet ejection motor 104 after the front end of the document S is detected by the sheet ejection sensor 61. Then, based on the result of computation, the deceleration of the driving speed of the sheet ejection motor 104 is started at the timing immediately before the rear end of the document S passes through the nip of the document output roller pair 94. By this deceleration control, the document S is ejected to the document stacker 55 at such a speed that the document S does not jump out of the document stacker 55.

By contrast, when the double-sided reading mode is adopted to read both the first face and the second side of the document S, control is performed as follows. In other words, after the front end of the document S is detected by the sheet ejection sensor 61, the timing at which the document S reaches the second-face reader 48 is computed based on the pulse count of the reading motor 103. Then, when the timing is computed, a gate signal that indicates the effective image area in the sub-scanning direction of the second face of the document S is sent from the controller 100 to the main body controller 111. The transmission of the gate signal is continued until the rear end of the document S passes through the second scanning position to be scanned by the second-face reader 48, and the second face of the document S is read by the second-face reader 48.

The second-face reader 48 that serves as an image reading unit includes a contact image sensor (CIS). Then, for the purpose of preventing a reading vertical streak due to the paste-like foreign substance adhering to the document S adhering to the reading surface, the reading surface is coated. A white reference guide plate 96 as a color reference component is disposed at a position facing the second-face reader 48 across the sheet conveyance path through which the document S passes. The white reference guide plate 96 prevents floating of the document S with respect to the second-face reader 48 at the second scanning position, and functions as a reference white portion used to generate shading data as correction data in the second-face reader 48.

The copier 1 according to the present embodiment is provided with, as the document conveyance and scanning unit 6 that reads the image of the document S that is being conveyed, two fixed image reading units 500 consisting of the first-face reader 40 and the second-face reader 48. The configuration that is used to read images on both sides of the document S is not limited to the configuration including two fixed image reading units 500. The document S whose front side has been read by one fixed image reading unit 500 may be switched back, and the rear side may be read when the document S passes through the scanning position of the fixed image reading unit 500 again.

Figure 5A:
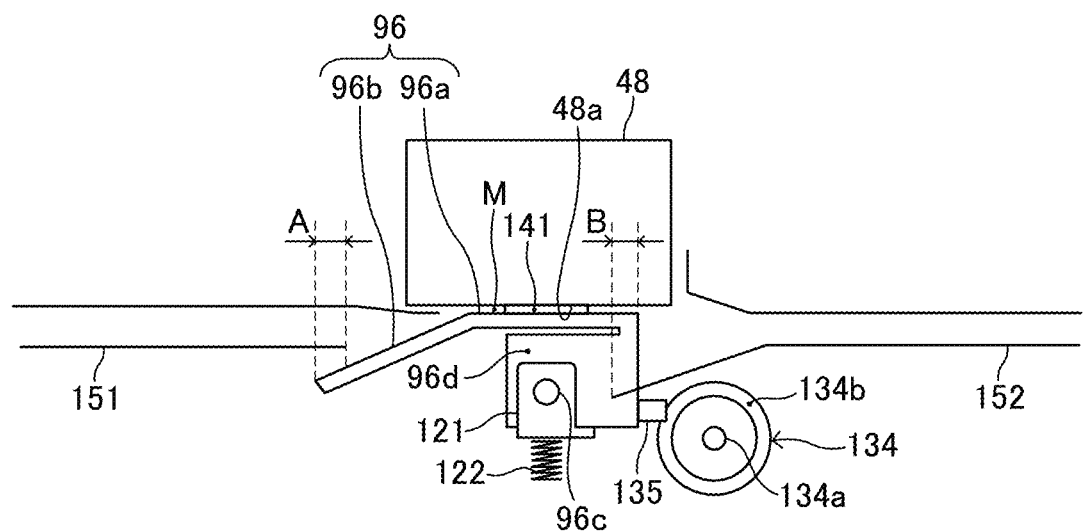
FIG. 5A is a schematic diagram illustrating an area around a second-face reader 48 according to an embodiment of the present disclosure.

FIG. 5A is a schematic diagram illustrating an area around the second-face reader 48 according to the present embodiment.

Figure 5B:
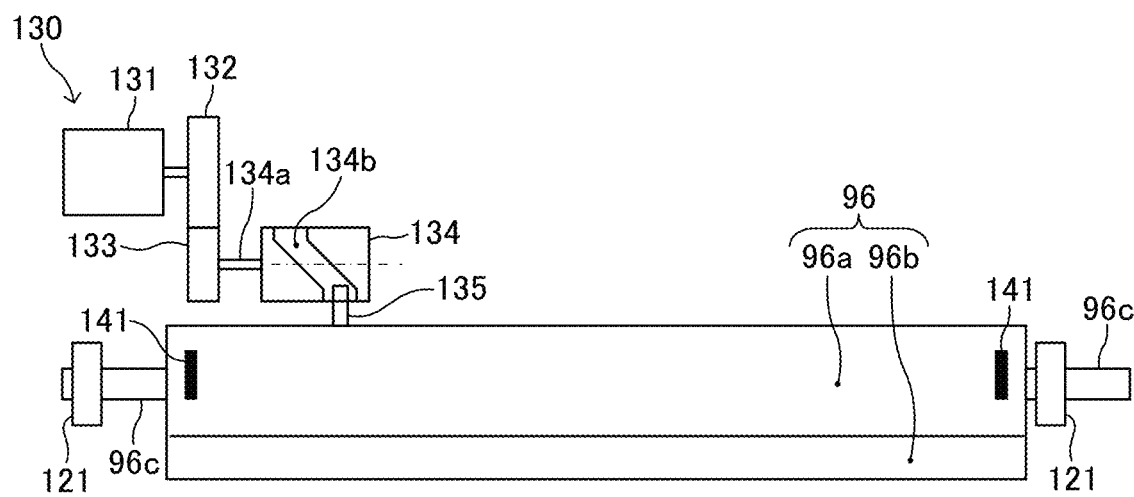
FIG. 5B is a schematic diagram illustrating a white reference guide plate viewed from a second-face reader, according to an embodiment of the present disclosure.

FIG. 5B is a schematic diagram illustrating the white reference guide plate 96 viewed from the second-face reader 48, according to the present embodiment.

The white reference guide plate 96 that serves as a color reference component includes a parallel face % a parallel to the surface to be read 48a of the second-face reader 48, and an inclined face 96a extending upstream from the upstream end of the parallel face 96b in the document conveyance direction. At least, the parallel face % a is white.

The inclined face % b is inclined so as to be separated from the second-face reader 48 upstream in the document conveyance direction. The upstream end of the inclined face 96b in the document conveyance direction subducts beneath a lower reading-entrance guide 151 that serves as an entrance guide, and an upstream portion of the white reference guide plate 96 in the document conveyance direction overlaps the lower reading-entrance guide 151 by A millimeters (mm) in length.

An upstream portion of a lower reading-exit guide 152 in the document conveyance direction, which serves as an exit guide and guides the document S that has passed through the second-face reader 48, is inclined so as to be separated from the second-face reader 48 upstream in the document conveyance direction. The upstream end of the lower reading-exit guide 152 in the document conveyance direction subducts beneath the white reference guide plate 96, and an downstream portion of the white reference guide plate 96 in the document conveyance direction overlaps the lower reading-exit guide 152 by B mm in length.

The white reference guide plate 96 includes a pair of supporting surfaces 96d each of which is perpendicular to the axial direction at both ends in the axial direction, i.e., the width direction of the document S and the main scanning direction, and a support axis 96c arranged approximately in the center of the supporting surfaces 96d.

The support axis 96c is received by a bearing 121 so as to be movable in the axial direction. The bearing 121 is held so as to be movable within a predetermined range in a direction toward and away from the second-face reader 48 with respect to the main body of the apparatus. Due to such a configuration, the white reference guide plate 96 and the bearing 121 can move within a predetermined range in a direction toward and away from the second-face reader 48. The bearing 121 is biased toward the second-face reader 48 by the pressing spring 122. Accordingly, the white reference guide plate 96 is biased toward the second-face reader 48 with a predetermined biasing force via the bearing 121.

The copier 1 according to the present embodiment is provided with a movement mechanism 130 that moves the white reference guide plate 96 in the axial direction. The movement mechanism 130 according to the present embodiment is provided with a cam 134 and a cam motor 131 that drives the cam 134 to rotate. A motor gear 132 is attached to the motor axis of the cam motor 131, and an output gear 133 that engages with the motor gear 132 is provided for a cam axis 134a. A tip of a stud 135 provided on the white reference guide plate 96 enters a cam groove 134b of the cam 134. As described above, as the stud 135 of the white reference guide plate 96 enters the cam groove 134b, the movement of the white reference guide plate 96 in the axial direction is controlled by the cam 134, and the white reference guide plate 96 may move in the axial direction only by the rotation of the cam 134.

As illustrated in FIG. 5A, the bottom face of the cam groove 134*b* faces the stud 135 from a downstream side in the document conveyance direction. Accordingly, the movement of the stud 135 in a direction toward and away from the second-face reader 48 is not restricted with respect to the cam groove 134*b*. Accordingly, the white reference guide plate 96 is movable without being restricted by the cam 134 in the direction where the white reference guide plate 96 moves toward and away from the second-face reader 48.

A pair of spacers 141 are provided at both ends of the parallel face 96*a* in the axial direction i.e., the width direction of the document S and the main scanning direction. The spacers 141 contact the surface to be read 48*a* of the second-face reader 48, and secures a predetermined conveyance gap M between the parallel face 96*a* of the white reference guide plate 96 and the surface to be read 48*a* of the second-face reader 48.

The spacer 141 may be shaped like a sheet or a block. It is desired that material of the spacer 141 have good slidability for the surface to be read 48*a* of the second-face reader 48 that is a glass plane. This is because when the white reference guide plate 96 is moved in the axial direction as driven by the rotation of the cam 134, the spacer 141 slides on the surface to be read 48*a*. Accordingly, as the spacer 141 is made of a material with good slidability, the sliding resistance of the white reference guide plate 96 for the surface to be read 48*a* of the spacer 141 can be reduced while the white reference guide plate 96 is moving in the axial direction, and the white reference guide plate 96 can smoothly be moved in the axial direction.

In the present embodiment, the white reference guide plate 96 is provided with a pair of spacers. However, no limitation is indicated thereby, and a spacer may be arranged outside the document conveying area of the surface to be read 48*a* of the second-face reader 48.

In the present embodiment, an upstream portion of the white reference guide plate 96 in the document conveyance direction serves as the inclined face % b that separates from the second-face reader 48 as inclined upstream in the document conveyance direction. Due to such a configuration, the document can be subducted beneath the lower reading-entrance guide 151 and be overlapped, and the document can be bent upstream from the second-face reader 48 in a direction away from the second-face reader 48.

In the present embodiment, the document conveyance speed of the first reading exit roller pair 92 is made higher than the conveyance speed of the second reading exit roller pair 93, and the document is bent at the gap between the first reading exit roller pair 92 and the second reading exit roller pair 93. The inclined face 96*b* is inclined so as to be separated from the second-face reader 48, and the space diverges downward upstream from the conveyance gap M in the document conveyance direction. Accordingly, a portion of the document upstream from the document conveying gap M in the document conveyance direction is bent along the inclined face 96*b*. Then, the sheet P is lifted toward the second-face reader 48 as guided by the inclined face 96*b*. As a result, the document can be conveyed as desired through the conveyance gap M in contact with the surface to be read 48*a* of the second-face reader 48. As the document is conveyed through the conveyance gap M in contact with the surface to be read 48*a* of the second-face reader 48 as described above, extraneous matter such as dust that adheres to the surface to be read 48*a* can be transferred to the document to clean the surface to be read 48*a*. The document can be conveyed with stabilized gap between the second-face reader 48 and the document.

It is desired that the white reference guide plate 96 be arranged below the second-face reader 48. As the white reference guide plate % is arranged below the second-face reader 48, the document can be bent toward the inclined face % b due to its own weight when the document is bent or deformed between the first reading exit roller pair 92 and the second reading exit roller pair 93. As a result, the document can be conveyed as desired through the conveyance gap M in contact with the surface to be read 48*a* of the second-face reader 48.

FIG. 6A1, FIG. 6A2, FIG. 6B1, and FIG. 6B2 are diagrams illustrating how the document S is conveyed when the white reference guide plate % of FIG. 5A and FIG. 5B is a white reference roller 196 and how the document S is conveyed according to the present embodiment.

More specifically, FIG. 6A1 and FIG. 6A2 are diagrams illustrating how the document S is conveyed with the white reference roller 196, and FIG. 6B1 and FIG. 6B2 are diagrams illustrating how the document S is conveyed according to the present embodiment.

As illustrated in FIG. 6A1 and FIG. 6A2, when the color reference component has a roller shape, a gap appears at an upstream document passing portion X1 where the document is passed from the lower reading-entrance guide 151 to the white reference roller 196 in the document conveyance direction. Moreover, a gap appears at a downstream document passing portion X2 where the document is passed from the white reference roller 196 to the lower reading-exit guide 152 in the document conveyance direction.

Accordingly, if the front end of the document S is curled in a direction away from the second-face reader 48, there is some concern that the front end of the document S may get into the space of the upstream document passing portion X1. Moreover, as illustrated in FIG. 6A2, there is some concern that the front end of the document S may get into the space of the downstream document passing portion X2. As described above, when the front end of the document S gets into the space of the upstream document passing portion X1 or when the front end of the document S gets into the space of the downstream document passing portion X2, there is some concern that paper jam may occur.

By contrast, in the present embodiment, a plate-like white reference guide plate 96 is used as the color reference component. Due to such a configuration, as illustrated in FIG. 6B1, an upstream portion of the w % bite reference guide plate 96 in the document conveyance direction can be overlapped with the lower reading-entrance guide 151. Moreover, a downstream portion of the white reference guide plate 96 in the document conveyance direction can be overlapped with the lower reading-exit guide 152.

As an upstream portion of the white reference guide plate 96 in the document conveyance direction overlaps with the lower reading-entrance guide 151. As a result, the appearance of a gap at the upstream document passing portion X1 in the document conveyance direction can be prevented. Accordingly, even if the front end (SR) of the document S is curled in a direction away from the second-face reader 48, the document can be passed from the lower reading-entrance guide 151 to the white reference guide plate 96 as desired. Accordingly, the occurrence of paper jam at the upstream document passing portion X1 can be prevented.

As described above, a downstream portion of the white reference guide plate 96 in the document conveyance direction is overlapped with the lower reading-exit guide 152. As a result, the appearance of a gap at the downstream document passing portion X2 in the document conveyance direction can be prevented. As a result, even if the front end (SR) of the document is curled in a direction away from the second-face reader 48, as illustrated in FIG. 6B2, the document can be passed from the white reference guide plate 96 to the lower reading-exit guide 152 as desired. Accordingly, the occurrence of paper jam at the downstream document passing portion X2 can be prevented.

Figure 7A:
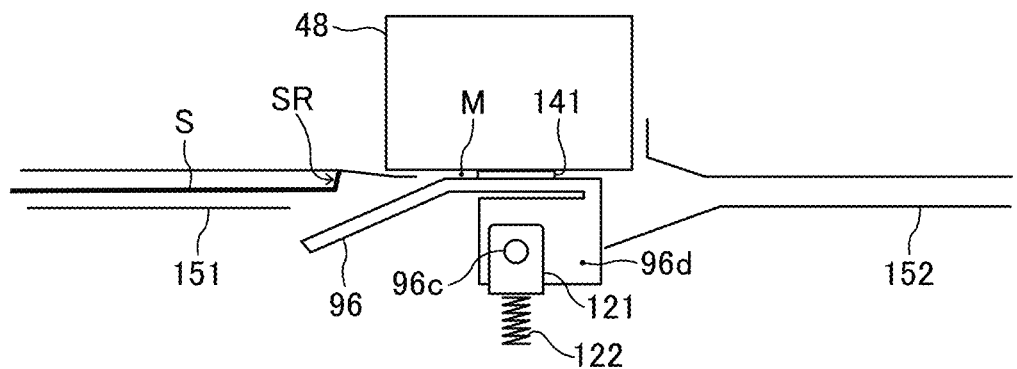
FIG. 7A, FIG. 7B, and FIG. 7C are diagrams illustrating how a thin paper document having a front-end crimping passes through a conveyance gap, according to an embodiment of the present disclosure.
Figure 7B:
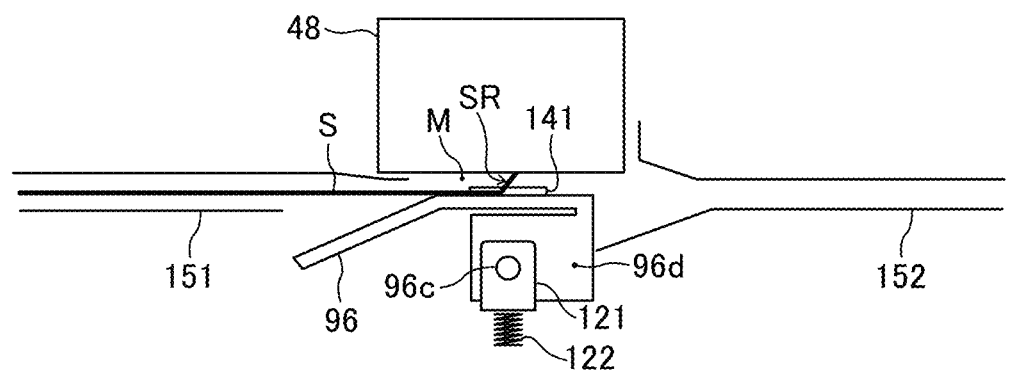
Figure 7C:
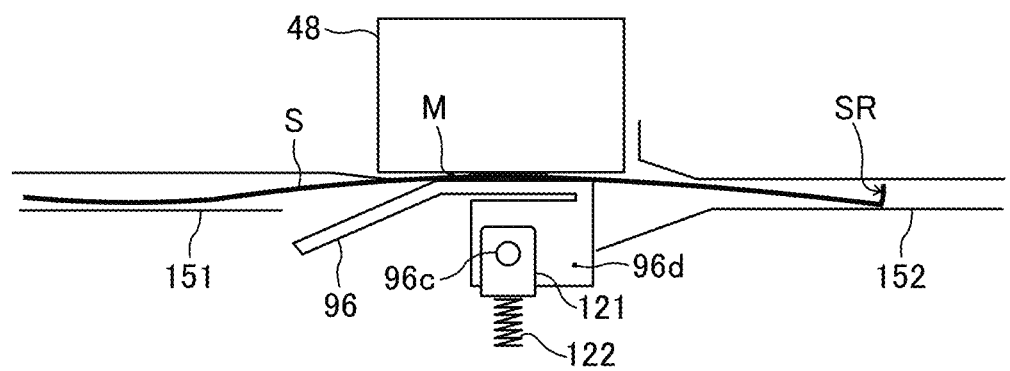

FIG. 7A, FIG. 7B, and FIG. 7C are diagrams illustrating how a thin paper document S having a front-end crimping SR passes through a conveyance gap M, according to the present embodiment.

In the present embodiment, a prescribed conveyance gap M is formed between the white reference guide plate 96 and the second-face reader 48 by the spacer 141. Accordingly, a document such as a thin sheet having a thickness less than the conveyance gap M passes through the conveyance gap M without pressing down the white reference guide plate 96 in a direction away from the second-face reader 48 in response to the pressing force of the pressing spring 122.

If there is a damage such as a stapler trace at the front end of a thin paper document that can pass through the gap between the white reference guide plate 96 and the second-face reader 48 without pressing down the white reference guide plate 96 under ordinary circumstances, crimping may occur at the front end of the document. As a result, as illustrated in FIG. 7A, a thin paper document having a front-end crimping SR may be conveyed to the gap between the second-face reader 48 and the white reference guide plate 96.

In the present embodiment, an inexpensive unit with shallow focal length is used as the second-face reader 48, and the conveyance gap M between the parallel face 96a and the reading surface 48a is set to be narrow. Accordingly, the height of the front-end crimping SR tends to be greater than the conveyance gap M. As a result, a thin paper document that can pass through the conveyance gap without pushing down the white reference guide plate 96 under ordinary circumstances cannot pass through the conveyance gap without pressing down the white reference guide plate 96. However, the resilience of thin paper document is so weak that the white reference guide plate 96 cannot be pushed down in response to the pressing force of the pressing spring 122. As a result, there is some concern that paper jam may occur.

In order to handle such a situation, in the present embodiment, the pressing force of the pressing spring 122 makes the white reference guide plate 96 go away in a direction away from the second-face reader 48 in response to the pressing force received from the being-conveyed thin paper document that has a front-end crimping SR and is thicker than the conveyance gap M.

Due to such a configuration, when the thin paper document having a front-end crimping is conveyed to the conveyance gap M, as illustrated in FIG. 7B, the white reference guide plate 96 can be pushed down in a direction away from the second-face reader 48 in response to the pressing force of the pressing spring 122. Due to such a configuration, the document can be conveyed to the conveyance gap M as illustrated in FIG. 7C.

The pressing force of the pressing spring 122 lowers the white reference guide plate 96 when the pressing force of thin paper document with low resilience is weak. For this reason, when the thickness of a document is wider than the conveyance gap M, the white reference guide plate 96 can be easily pushed down. Accordingly, the load of conveying the document while the white reference guide plate % is pushed down can be prevented form increasing, and the speed of conveying the document can be prevented from decreasing. While the white reference guide plate 96 is being pushed down by the front end of the document, the image of the rear end of the document is still being read by the first-face reader 40. Accordingly, the conveyance speed of the document while the white reference guide plate % is being pushed down is prevented from decreasing, and the occurrence of shock jitter or an unity-magnification error in the sub-scanning direction on the read image read by the first-face reader 40 can be prevented.

Figure 8A:
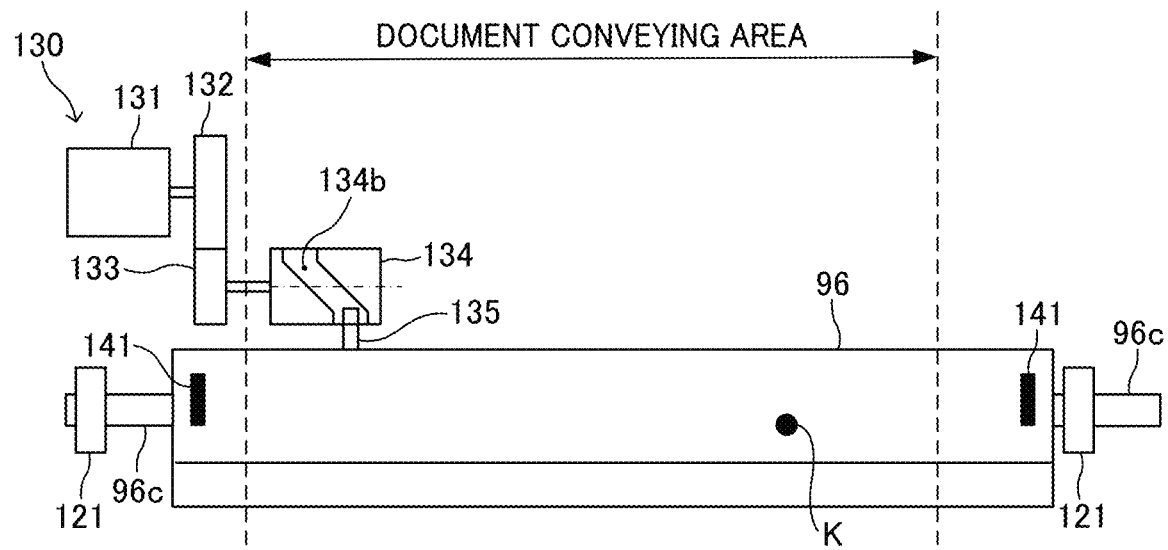
FIG. 8A and FIG. 8B are diagrams each illustrating the movement of a white reference guide plate in the axial direction, according to an embodiment of the present disclosure.
Figure 8B:
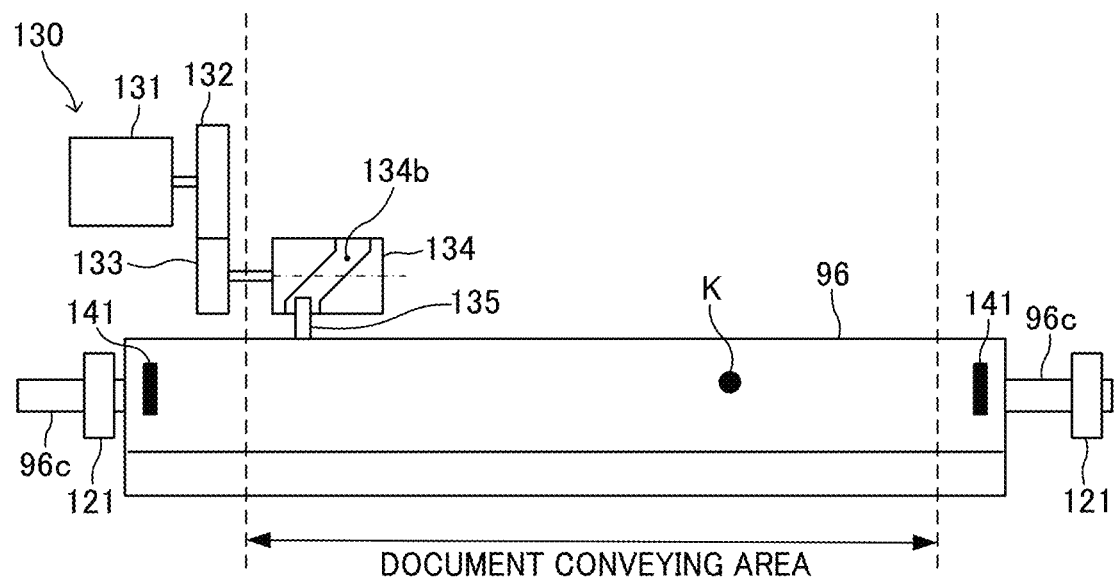

FIG. 8A and FIG. 8B are diagrams each illustrating the movement of the white reference guide plate 96 in the axial direction, according to the present embodiment.

When the cam motor 131 is driven to rotate the cam 134, the relative positions of the cam 134 to the stud 135 of the white reference guide plate 96 that has entered the cam groove 134b move within the cam groove 134b. Then, when the relative positions of the cam 134 to the stud 135 that is inclined in the axial direction of the cam groove 134b move, the stud 135 is guided by the cam groove 134b in the axial direction. The white reference guide plate 96 is supported by the bearing 121 so as to be movable within a predetermined range in the axial direction. Accordingly, the white reference guide plate 96 is moved in the axial direction by the guide in the axial direction of the cam groove 134b. As a result, dirt K on the white reference guide plate 96 moves in the axial direction together with the white reference guide plate 96.

The amount of axial movement of the white reference guide plate 96 is set so that the pair of spacers 141 arranged at both ends in the axial direction of the white reference guide plate 96 do not enter the document carrying area. More specifically, the configuration of the cam groove 134b and the driving force for the cam motor 131 are controlled to set the amount of axial movement such that the pair of spacers 141 will not enter the document conveyance area.

In the present embodiment, the spacer 141 is made of a material having good slidability. Accordingly, the white reference guide plate 96 can be smoothly moved in the axial direction in cooperation with the weak pressing force of the pressing spring 122.

The correction data generating processes in which shading data is generated is described below. Such shading data in the correction data generating processes is correction data used to perform shading correction on the image data read by the second-face reader 48.

There are some cases in which, for example, toner, ink, and pencil pigment adhering to the document are transferred to the white reference guide plate 96 and the white reference guide plate 96 is contaminated. As illustrated in FIG. 8A and FIG. 8B, when the white reference guide plate 96 having the stain K is scanned to obtain white reference data and the shading data is generated based on the acquired white reference data, an undesired result may occur as follows. For example, shading data is generated based on the assumption that a portion of the white reference guide plate 96 that is not white due to the stain K is also white. Accordingly, the shading correction value of the portion corresponding to the stain K of the white reference guide plate 96 of the shading data becomes an erroneous value. As a result, when the image data that is read by the second-face reader 48 is corrected by the shading data, a vertical streak occurs on the corrected image, and the image quality of the read image deteriorates.

In order to handle such a situation, in the present embodiment, a plurality of items of white reference data are acquired while moving the white reference guide plate 96 in the axial direction, i.e., the main scanning direction, and shading data is generated based on the multiple items of white reference data.

Figure 9:
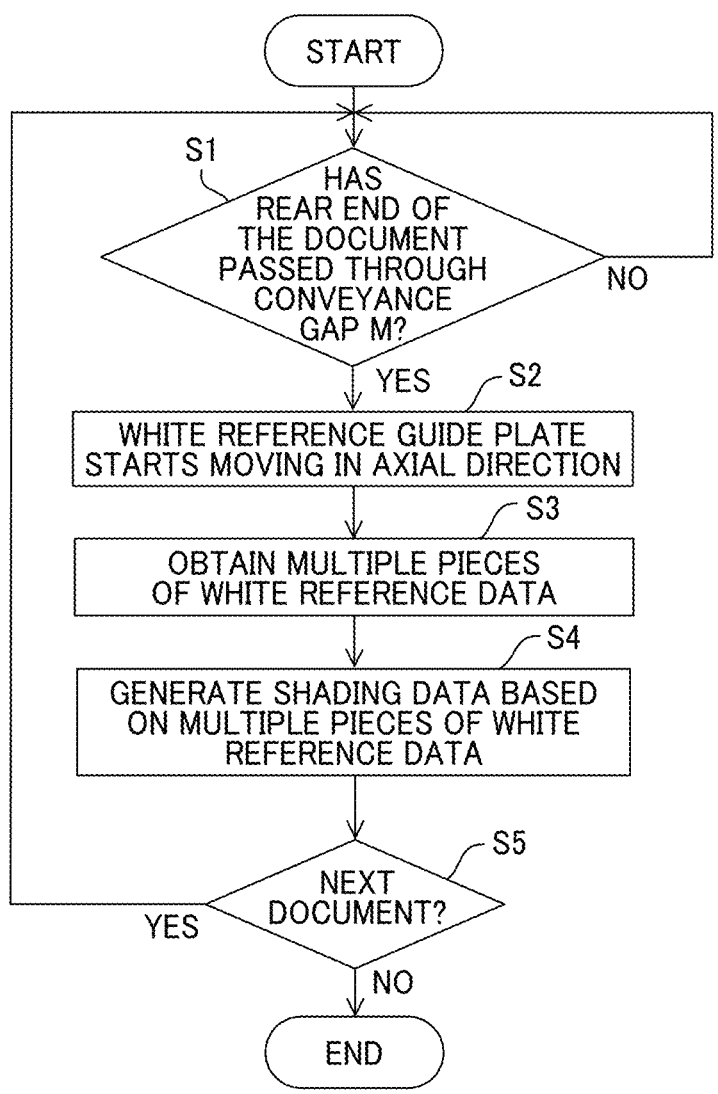
FIG. 9 is a flowchart of correction data generating processes according to an embodiment of the present disclosure.

FIG. 9 is a flowchart of correction data generating processes according to the present embodiment.

As the image quality of the read image changes due to the influence of heat caused by continuous operation, in the present embodiment, the second-face reader 48 generates the shading data for each clearance or sheet interval of the documents.

Firstly, when the rear end of the document has passed through the conveyance gap M ("YES" in the step S1), in a step S2, the controller 100 (see FIG. 3) drives the cam motor 131 to start the movement of the white reference guide plate 96 in the axial direction. In the present embodiment, when the sheet ejection sensor 61 (see FIG. 2) disposed between the first reading exit roller pair 92 and the second-face reader 48 detects the rear end of the document and a predetermined length of time elapses, it is determined that the rear end of the document has passed through the conveyance gap M.

Subsequently, while the white reference guide plate 96 moves from the position illustrated in FIG. 8A to the position illustrated in FIG. 8B, in a step S3, the second-face reader 48 scans the white reference guide plate 96 a plurality of times to obtain a plurality of items of white reference data.

Subsequently, in a step S4, the controller 100 generates shading data based on the obtained plurality of items of white reference data. More specifically, the data closest to white is extracted from the multiple items of white reference data acquired for multiple positions in the main scanning direction. Then, a shading correction value is calculated for each position in the main scanning direction based on the extracted data closest to white to generate shading data.

As described above with reference to FIG. 8A and FIG. 8B, as the white reference guide plate 96 is moved in the axial direction, i.e., the main scanning direction, the position of the stain K on the white reference guide plate 96 moves in the axial direction. Due to such a configuration, when a stain on the white reference guide plate 96 is read from a portion in the main scanning direction in one of the multiple items of white reference data, a stainless portion on the white reference guide plate 96 is read in another one of the multiple items of white reference data. Accordingly, for each position in the main scanning direction, the data closest to white is extracted from the acquired multiple items of white reference data, and the shading data is generated based on the data closest to white for each position in the main scanning direction. Due to such a configuration, the shading correction value for each position in the main scanning direction of the shading data is a value calculated based on the image data obtained by reading a stainless portion of the white reference guide plate 96. As a result, shading correction can be performed as desired on the image read by the second-face reader 48, and a high-quality read image can be obtained.

In the present embodiment, the white reference guide plate 96 is moved in the axial direction to acquire a plurality of items of white reference data. However, no limitation is indicated thereby, and the white reference guide plate 96 may be moved in the document conveyance direction to acquire a plurality of items of white reference data. However, the stain on the white reference guide plate 96 may be a linear stain that extends in the document conveyance direction as stretched in the document conveyance direction by the document being conveyed. Accordingly, there is a possibility that the stain is read at the same position in the main scanning direction in regard to all the acquired white reference data and accurate shading data cannot be generated. Accordingly, it is desired that the white reference guide plate 96 be moved in the axial direction to acquire a plurality of items of white reference data.

The white reference roller 196 as illustrated in FIG. 6A1 and FIG. 6A2 is configured to rotate together with the document being conveyed, and is configured such that its front face is movable in the document conveyance direction at a position facing the second-face reader 48. However, as the white reference roller 196 does not rotate during the shading data acquisition operation, the correction value tends to be calculated based on the image data obtained as the stain on the white reference guide plate 96 is scanned.

The processes of generating shading data in steps S1 to S4 as illustrated in FIG. 9 are completed before the next document reaches the conveyance gap M. In the correction data generating processes before the next document arrives, the white reference guide plate 96 moves from the position as illustrated in FIG. 8A to the position as illustrated in FIG. 8B. Accordingly, the white reference guide plate 96 receives the next document at the position as illustrated in FIG. 8B. As described above, the white reference guide plate 96 is moved such that the spacer 141 will not enter the document conveying area. Accordingly, even if the white reference guide plate 96 stands by at the position illustrated in FIG. 8B, the document can pass through the gap between the second-face reader 48 and the white reference guide plate 96 without being caught by the spacers 141.

In the correction data generating processes after the next document passes through the gap between the second-face reader 48 and the white reference guide plate 96, a plurality of items of white reference data are acquired while moving the white reference guide plate 96 from the position as illustrated in FIG. 8B to the position as illustrated in FIG. 8A.

In the present embodiment, the shading data is generated before the image on the next document is read by the second-face reader 48. Accordingly, the image of the next document read by the second-face reader 48 can be corrected based on the shading data generated in clearance or the sheet interval before the next document. As a result, the changes in image quality from moment to moment due to the influence of the heat of the second-face reader 48 can be dealt with as desired, and a scanned image can be obtained with high quality.

For example, when the correction data generating processes are performed and stain is detected in the white reference data acquired by reading the w % bite reference guide plate 96, it takes a long time to acquire the shading data. This is because the white reference guide plate 96 needs to be moved and the correction data generating processes need to be performed again to read the white reference guide plate 96. As a result, there is a possibility that the shading data cannot be generated until the next document reaches the second-face reader 48. However, in the present embodiment, a plurality of items of white reference data are acquired while the white reference guide plate 96 is moving. Due to such a configuration, accurate shading data can be acquired by one-time acquisition operation. Due to such a configuration, generation of shading data with high accuracy can be completed before the next document reaches the second-face reader 48.

In the present embodiment, the correction data generating processes are executed by the second-face reader 48 and the white reference guide plate 96 for each clearance or sheet interval of the documents read by the first-face reader 40 or the second-face reader 48. However, no limitation is indicated thereby, and for example, a temperature sensor that detects the temperature of the second-face reader 48 may be provided, and the correction data generating processes may be executed based on the detection result of the temperature sensor.

Some modifications of the above embodiments of the present disclosure are described below.

First Modification

Figure 10:
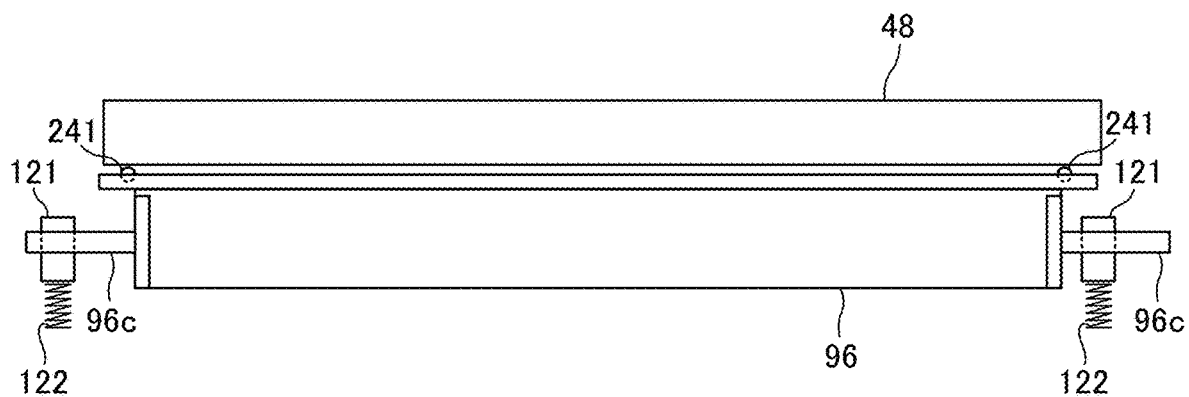
FIG. 10 is a schematic diagram illustrating an area around a second-face reader according to a first modification of the above embodiments of the present disclosure.

FIG. 10 is a schematic diagram illustrating an area around the second-face reader 48 according to a first modification of the above embodiments of the present disclosure.

In the first modification of the above embodiments of the present disclosure, a spherical roller 241 is used as a spacer, and such a roller 241 is rotatably embedded at both ends of the parallel face 96a of the white reference guide plate 96 in the axial direction. The material of the roller 241 may be a resin, or may be an elastic member having hardness to such an extent that it does not contract due to the pressing force of the white reference guide plate 96 against the second-face reader 48. With this configuration, when the white reference guide plate 96 is moved in the axial direction relative to the second-face reader 48, the roller 241 rolls in the axial direction. Accordingly, compared with a configuration in which the spacer slides on the surface to be read 48a when the white reference guide plate 96 moves in the axial direction, the occurrence of scratches on the surface to be read 48a can be prevented. Moreover, when the white reference guide plate 96 moves in the axial direction, abnormal sound such as sliding noise can be prevented from occurring between the spacer and the surface to be read 48a.

As the roller 241 is made of an elastic member, the roller 241 can be made softer than the surface to be read 48a of the glass plate, thereby preventing the surface to be read 48a from being damaged.

An axially rotatable roller may be used as the spacer. Even when the spacer is a roller, in a similar manner to the case of a roller, the occurrence of a scratch on the surface to be read 48a can be prevented, and the occurrence of abnormal noise while the white reference guide plate 96 is moving in the axial direction can be prevented. As an elastic member is wound around the surface of the roller, the surface to be read 48a can be prevented from being damaged.

Second Modification

Figure 11:
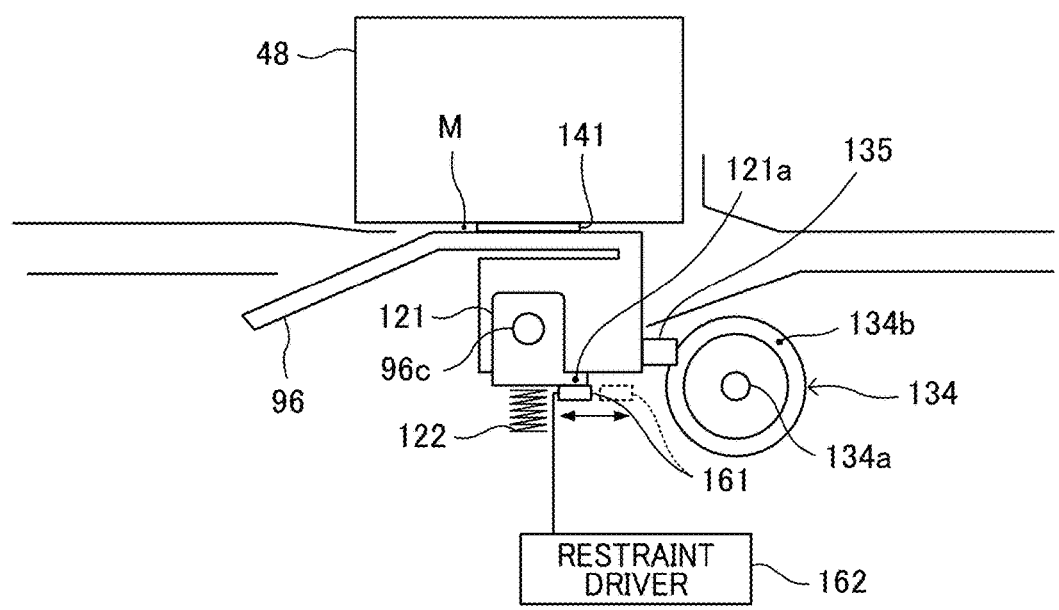
FIG. 11 is a schematic diagram illustrating an area around a second-face reader according to a second modification of the above embodiments of the present disclosure.

FIG. 11 is a schematic diagram illustrating an area around the second-face reader 48 according to a second modification of the above embodiments of the present disclosure.

In the second modification of the above embodiments of the present disclosure, a regulatory mechanism is provided to control the movement of the white reference guide plate 96 in the direction toward or away from the second-face reader 48.

As illustrated in FIG. 11, a to-be-controlled protrusion 121a is formed on the bearing 121 that movably supports the white reference guide plate 96 in the axial direction. Further, a restraint 161 is provided that is configured to be movable between a regulatory position facing the side of the to-be-controlled protrusion 121a away from the second-face reader 48 and a retract position where the restraint 161 retracts from the regulatory position. The restraint 161 is coupled to a restraint driver 162 that drives the restraint 161 to move between the regulatory position and the retract position.

There are some cases in which an image on a folded document such as a Z-folded document and a document folded into two is to be scanned and obtained. In such cases, the folded document is unfolded and is set on the document table 53. For this reason, the document to be conveyed has a folded portion. When the folded portion of the document is conveyed to the conveyance gap M, there is some concern that the white reference guide plate 96 may be pushed down by the folded portion of the document. As a result, the image surface of the folded portion of the document deviates from the focal depth of the second-face reader 48, and there is a possibility that the image of the folded portion cannot be read as desired.

In order to handle such a situation, in the second modification of the above embodiments of the present disclosure, a regulatory mechanism is provided to control the movement of the white reference guide plate 96 in the direction separating from the second-face reader 48 when the folded portion of the document passes through the conveyance gap M.

In the present modification of the above embodiments of the present disclosure, the thickness data of the conveyed document is acquired by a paper-thickness sensor 106 (see FIG. 2) that serves as a thickness data acquisition unit disposed between the contact sensor 72 and the reading entrance roller pair 97. Alternatively, the control panel 108 may be operated to input the sheet thickness data of the document set on the document table 53, and the sheet thickness data of the document may be acquired from the input data. In this configuration, the control panel 108 serves as a thickness data acquisition unit.

When the thickness of the document is thicker than the conveyance gap M, the document cannot pass through the conveyance gap M if the movement of the white reference guide plate 96 is restricted. Accordingly, the movement of the white reference guide plate 96 is not restricted by the regulatory mechanism when the thickness of the document is thicker than the conveyance gap M. On the other hand, when the thickness of the document is equal to or smaller than the conveyance gap M, the movement of the white reference guide plate 96 is controlled as follows.

In other words, firstly, until the front end of the document passes through the conveyance gap M, the controller 100 positions the restraint driver 162 at the retract position and allows the movement of the white reference guide plate 96 in the direction away from the second-face reader 48. Due to such a configuration, when the front end of the document conveyed to the conveyance gap M has a crimping, the white reference guide plate 96 moves in a direction away from the second-face reader 48. Due to such a configuration, the document can be conveyed without causing paper jam before the conveying gap M.

When the front end of the document has reached the second reading exit roller pair 93 and the document is ready to be conveyed by the second reading exit roller pair 93, the restraint 161 is switched and moved from the retract position to the regulatory position. Due to such a configuration, the movement of the white reference guide plate 96 in the direction away from the second-face reader 48 is restricted. Normally, a folded portion on the document caused by, for example, Z-folding and folding into two is located at a certain distance from the front end of the document. For this reason, if the movement of the white reference guide plate 96 in the direction away from the second-face reader 48 is controlled at the timing when the front end of the document reaches the second reading exit roller pair 93, the movement can be controlled before the folded portion of the document reaches the conveyance gap M.

When the folded portion of the document passes through the conveyance gap M, the restraint 161 restricts the white reference guide plate 96 from being pushed down by the folded portion of the document. Due to such a configuration, the image surface of the folded portion of the document can be prevented from deviating from the focal depth of the second-face reader 48, and the image on the second face of the document can be read as desired. As the movement of the white reference guide plate 96 is controlled, the load of conveying the document increases when the folded portion passes through the conveyance gap M. However, when the front end of the document reaches the second reading exit roller pair 93, and conveying force is given to the front end of the document by the second reading exit roller pair 93. Accordingly, the document can be conveyed as desired without being jammed at the conveyance gap M.

Once the rear end of the document passes through the conveyance gap M, the restraint 161 is moved to the retract position to allow the white reference guide plate 96 to move in the direction away from the second-face reader 48.

Third Modification

Figure 12:
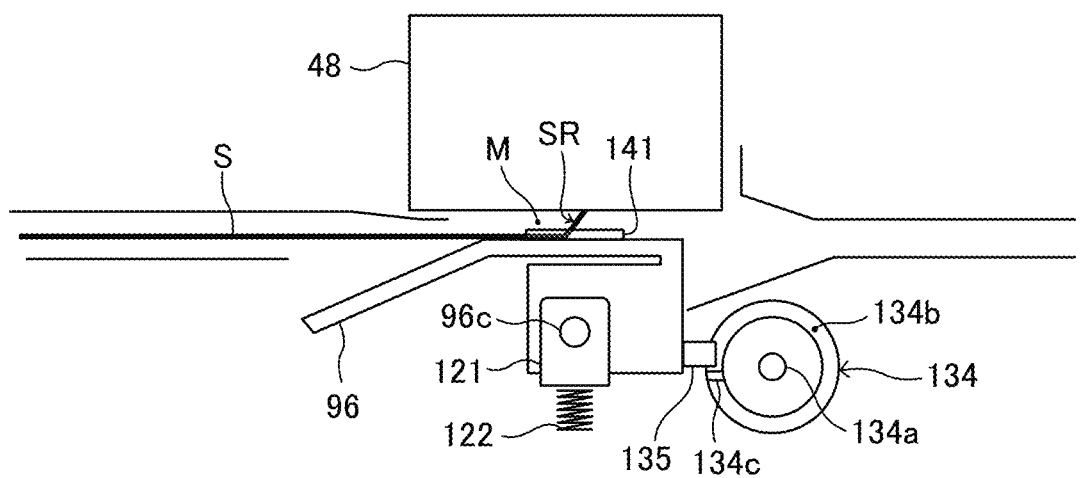
FIG. 12 is a schematic diagram illustrating an area around a second-face reader according to a third modification of the above embodiments of the present disclosure.

FIG. 12 is a schematic diagram illustrating an area around the second-face reader 48 according to a third modification of the above embodiments of the present disclosure.

In the third modification of the above embodiments of the present disclosure, a restraint portion 134c is arranged on the cam groove 134b of the cam 134, and the moving mechanism 130 that is used to move the white reference guide plate 96 in the axial direction has the function of a regulatory mechanism that controls the movement of the white reference guide plate 96 in the direction separating from the second-face reader 48.

The restraint portion 134c is arranged parallel to the axial direction at a portion of the cam groove 134b extending straight in the rotation direction of the cam, and faces the stud 135 from the side away from the second-face reader 48. The movement of the white reference guide plate 96 in the direction away from the second-face reader 48 is restricted by the abutment of the stud 135 against the 134c of the restriction portion.

In the third modification of the above embodiments of the present disclosure, the stop position of the cam 134 is controlled. Accordingly, the position of the restraint portion 134c can be changed in the direction toward or away from the second-face reader 48, and the regulatory position of the white reference guide plate 96 can be changed.

Also in the third modification of the above embodiments of the present disclosure, in a similar manner to the above second modification, when the front end of the document passes through the conveyance gap M, the restraint portion 134c is moved to the retract position as illustrated in FIG. 12 where the restraint portion 134c does not contact the stud 135. Due to such a configuration, as illustrated in FIG. 12, when the front end SR of the document conveyed to the conveyance gap M has a crimping, the white reference guide plate 96 moves in a direction away from the second-face reader 48. Accordingly, the document can be conveyed without causing paper jam before the conveying gap M.

When the front end of the document reaches the second reading exit roller pair 93 and the document is ready to be conveyed by the second reading exit roller pair 93, the cam 134 is rotated clockwise in the direction in the drawing, and the restraint portion 134c is moved to the regulatory position according to the paper thickness of the document being conveyed. More specifically, the cam motor 131 is controlled based on sheet thickness data acquired by the paper-thickness sensor 106 or the sheet thickness data acquired by the operation on the control panel 108, the restraint portion 134c is moved to the regulatory position according to the paper thickness of the document.

In the third modification of the above embodiments of the present disclosure, the movement of the white reference guide plate 96 in the direction away from the second-face reader 48 can also be controlled with respect to the document whose paper thickness is greater than the conveyance gap M. As a result, the image surface on the folded portion of the document can be prevented from deviating from the focal depth of the second-face reader 48 even for the document with the folded portion whose paper thickness is greater than the conveyance gap M. and the image on the second face of the document can be read as desired.

The white reference guide plate 96 that faces the second-face reader 48 is described in the above description. However, no limitation is indicated thereby, and the embodiments of the present disclosure can be applied to a white reference guide that is arranged to face the first-face reader 40 at the first scanning position 700.

The embodiments described above are given as an example, and unique advantageous effects are achieved for each of the following modes given below.

First Mode

An image reading device includes an image reading unit such as the second-face reader 48 configured to read an image on a document, and a color reference component such as the white reference guide plate 96 arranged so as to face the image reading unit. In such an image reading device, the image reading unit reads the color reference component at a prescribed timing to obtain color reference image data, and correction data generating processes are executed based on the obtained color reference image data to generate correction data such as the shading data used to correct data of the image read by the image reading unit. Moreover, the color reference component is moved relative to the image reading unit in a direction orthogonal to a direction toward and away from the image reading unit.

There are some undesired cases in which an extraneous matter such as dust adheres to a document is transferred to a color reference component such as the white reference guide plate 96 the color reference component is contaminated. If the color reference component is contaminated as described above, the color of the contaminated portion becomes different from the original color of the color reference component. Accordingly, the correction value of the portion corresponding to the contaminated portion of the color reference component of the correction data such as the shading data generated based on the color reference image data obtained by reading the color reference component becomes abnormal. As a result, the read image data cannot be normally be corrected at some portions, and an abnormality such as a vertical stripe is detected on the read image corrected based on the correction data. Accordingly, the image quality of the read image deteriorates.

In the image reading device according to the first mode of the present disclosure, during the correction data generating processes, the color reference component is moved relative to the image reading unit in a direction orthogonal to a direction toward and away from the image reading unit. As a result, a contaminated portion of the color reference component is moved, and the contaminated portion is scanned by the image reading unit at a different position.

Accordingly, a plurality of items of color reference image data are obtained while the color reference component is being moved relative to the image reading unit, and a stainless portion is read in one of the multiple items of color reference image data at a position where a contaminated portion of the color reference component is read in another one of the multiple items of color reference image data. By means of these two items of color reference image data, for example, correction data can be generated for a contaminated portion of the color reference component in one of the multiple items of color reference image data, based on the image data obtained from a stainless portion of another one of the multiple items of color reference image data, which corresponds to the contaminated portion. By so doing, a correction value can be calculated for any portion based on the original color of the color reference component. Accordingly, correction can be done as desired for all the positions of the read image data, and an abnormality such as a vertical stripe can be prevented from appearing on the read image. Further, the image quality of the read image of the document can be prevented from deteriorating.

Second Mode

In the image reading device according to the first mode of the present disclosure, the image reading unit such as the second-face reader 48 is configured to acquire a plurality of items of the color reference image data during the correction data generating processes while the color reference component such as the white reference guide plate 96 is being moved, and the correction data such as the shading data is generated based on the multiple items of the color reference image data.

According to the present mode, as described above in the embodiments of the present disclosure, image data of the color reference component with no stain or contamination such as the white reference guide plate 96 can be extracted from the obtained multiple items of white reference data for each position in the main scanning direction, and the correction data such as the shading data can be generated.

Third Mode

The image reading device according to the first or second mode of the present disclosure further includes a document conveyance unit that conveys the document to a gap such as the conveyance gap M between the image reading unit such as the second-face reader 48 and the color reference component such as the white reference guide plate 96, and during the correction data generating processes, the color reference component is moved relative to the image reading unit in a direction orthogonal to a direction in which the document passes through the gap between the image reading unit and the color reference component.

According to the present mode, as described above in the embodiments of the present disclosure, compared with the cases where the color reference component such as the white reference guide plate 96 is moved in the conveyance direction of the document, scanning a stain at the same position in the main scanning direction for all the obtained multiple items of white reference data can be prevented, and precise shading data can be generated.

Fourth Mode

The image reading device according to any one of the first mode to the third mode of the present disclosure further includes a document conveyance unit that conveys the document to a gap such as the conveyance gap M between the image reading unit such as the second-face reader 48 and the color reference component such as the white reference guide plate 96, and the correction data generating processes start after a rear end of the document in a conveyance direction has passed through the gap between the color reference component and the image reading unit. Moreover, the correction data generating processes end before a front end of a next document in the conveyance direction reaches the gap between the color reference component and the image reading unit.

According to the present mode, as described above in the embodiments of the present disclosure, a document image read by the image reading unit such as the second-face reader 48 can be corrected based on correction data such as shading data obtained immediately before the document image is scanned and obtained. Accordingly, the image quality of the read image due to the changes in image quality, which is caused by heat of continuous operation, can favorably be prevented from deteriorating.

Fifth Mode

The image reading device according to any one of the first mode to the fourth mode of the present disclosure further includes a document conveyance unit that conveys the document to a gap such as the conveyance gap M between the image reading unit such as the second-face reader 48 and the color reference component such as the white reference guide plate 96, and the color reference component is a plate-like component detachable from the image reading unit. Moreover, the color reference component is configured to guide the document such that the document conveyed to the gap between the image reading unit and the color reference component passes through the gap at a prescribed distance from the image reading unit.

According to the present mode, as described above in the embodiments of the present disclosure, the image of a document can be read as desired.

Sixth Mode

The image reading device according to the fifth mode of the present disclosure further includes an entrance guide such as the lower reading-entrance guide 151 configured to guide the document to the gap between the image reading unit such as the second-face reader 48 and the color reference component such as the white reference guide plate 96, and an exit guide such as the lower reading-exit guide 152 configured to guide the document passed through the image reading unit. Moreover, the color reference component has an upstream portion in an conveyance direction of the document, and the upstream portion of the color reference component overlaps with the entrance guide. Further, the color reference component has a downstream portion in the conveyance direction of the document, and the downstream portion of the color reference component overlaps with the exit guide.

Due to such a configuration, as described above with reference to FIG. 6A1, FIG. 6A2, FIG. 6B1, and FIG. 6B2, the appearance of a gap at the upstream document passing portion X1 where the document is passed from the entrance guide such as the lower reading-entrance guide 151 to the color reference component such as the white reference guide plate 96 in the document conveyance direction can be prevented. Moreover, the appearance of a gap at the downstream document passing portion X2 where the document is passed from the color reference component to the exit guide such as the lower reading-exit guide 152 in the document conveyance direction can be prevented. Accordingly, the occurrence of paper jam at the upstream document passing portion X1 and the downstream document passing portion X2 can be prevented.

Seventh Mode

The image reading device according to the fifth or sixth mode of the present disclosure further includes a pressurizer such as the pressing spring 122 configured to pressurize the color reference component such as the white reference guide plate 96 toward the image reading unit such as the second-face reader 48. Moreover, the pressurizer has pressing force, and the pressing force of the pressurizer causes the color reference component to retract in a direction away from the image reading unit due to pressing force of a thin paper document conveyed to the gap such as the conveyance gap M between the color reference component and the image reading unit.

Due to such a configuration, as described above with reference to FIG. 7, a thin paper document that has a front-end crimping SR can be prevented from being jammed in front of the conveyance gap M.

Eighth Mode

The image reading device according to any of the fifth mode to the seventh mode of the present disclosure further includes a regulatory mechanism configured to restrict movement of the color reference component such as the white reference guide plate 96 in a direction separating from the image reading unit such as the second-face reader 48, and the regulatory mechanism is configured to be switchable between a control state in which the movement of the color reference component in the direction separating from the image reading unit is controlled and an allowed state in which the movement of the color reference component in the direction separating from the image reading unit is allowed.

According to the present mode, as described above in the second modification of the present disclosure, an allowed state is adopted when the front end of the document passes through the conveyance gap M. By so doing, even if the document has a front-end crimping, the document can pass through the conveyance gap M. As a result, the document can be prevented from being jammed. When the folded portion of the document passes through the conveyance gap M, the movement of the document is restricted. Accordingly, the folded portion of the document can be conveyed within the depth of focus of the image reading unit, and the image on the folded portion can be read as desired.

Ninth Mode

The image reading device according to the eighth mode of the present disclosure further comprises a thickness data acquisition unit such as the paper-thickness sensor 106 that obtains the thickness data of the document, and the regulatory mechanism is configured to determine whether or not to restrict the movement of the color reference component such as the white reference guide plate 96 in the direction separating from the image reading unit, based on the thickness data obtained by the thickness data acquisition unit.

According to the present mode, as described above in the second modification of the present disclosure, if the movement of the color reference component such as the white reference guide plate 96 in a direction separating from the image reading unit is controlled, it can be configured such that the movement of a thick document is not restricted because such a thick document may cause paper jam.

Tenth Mode

The image reading device according to any one of the fifth mode to the eighth mode of the present disclosure further includes a regulatory mechanism configured to restrict movement of the color reference component such as the white reference guide plate 96 in a direction separating from the image reading unit such as the second-face reader 48, and the regulatory mechanism is configured to change a position at which movement of the color reference component is restricted.

According to the present mode, as described above in third modification of the present disclosure, the regulatory position can be changed depending on the thickness of the document.

Eleventh Mode

The image reading device according to the tenth mode of the present disclosure further comprises a thickness data acquisition unit such as the paper-thickness sensor 106 that obtains the thickness data of the document, and the position at which the movement of the color reference component is restricted is changed based on the thickness data obtained by the thickness data acquisition unit.

According to the present mode, as described above in third modification of the present disclosure, even if a thick document is used, the movement of the color reference component can be restricted when the folded portion of the document passes through the conveyance gap M, and the image of the folded portion of the document can be read as desired.

Twelfth Mode

In the image reading device according to any one of the eighth mode to the eleventh mode of the present disclosure, the regulatory mechanism is configured to restrict the movement of the color reference component such as the white reference guide plate 96 in the direction separating from the image reading unit such as the second-face reader 48 after a front end of the document has passed through the gap such as the conveyance gap M between the color reference component and the image reading unit.

According to the present mode, as described above in second modification and the third modification of the present disclosure, even if the document has a front-end crimping, the document can pass through the conveyance gap M. As a result, the document can be prevented from being jammed. When the folded portion of the document passes through the conveyance gap M, the movement of the document is restricted. Accordingly, the folded portion of the document can be conveyed within the depth of focus of the image reading unit, and the image on the folded portion can be read as desired.

Thirteenth Mode

The image reading device according to any one of the first mode to the twelfth mode of the present disclosure further includes a spacer configured to form a prescribed gap such as the conveyance gap M between the color reference component such as the white reference guide plate 96 and the image reading unit such as the second-face reader 48, outside the conveying area of the document of the color reference component or outside the conveying area of the document of the image reading unit. Moreover, in the image reading device according to any one of the first mode to the twelfth mode of the present disclosure, the spacer is rotatable.

According to the present mode, as described above in first modification of the present disclosure, the counterpart member that the spacer contacts can be prevented from being scratched. Moreover, the generation of sliding noise between the spacer and the counterpart member during correction data generating processes can be prevented.

Fourteenth Mode

The image reading device according to the thirteenth mode of the present disclosure further includes a counterpart member of the spacer. Moreover, the counterpart member includes a contact portion, and the contract portion is made of an elastic member.

According to the present mode, as described above in first modification of the present disclosure, the counterpart member that the spacer contacts can be prevented from being scratched or damaged.

Fifteenth Mode

An image forming apparatus includes an image reading device configured to read an image on a document, and an image is formed on a recording material based on data of the image read by the image reading device. In the image forming apparatus according to the fifteenth mode of the present disclosure, the image reading device according to one of the first mode to the fourteenth mode of the present disclosure is used as the image reading device. Due to such a configuration, an image can be copied as desired. Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present disclosure may be embodied in the form of a computer program stored on any kind of storage medium. Examples of storage media include, but are not limited to, flexible disks, hard disks, optical discs, magneto-optical discs, magnetic tape, nonvolatile memory cards, read only memory (ROM), etc. Alternatively, any one of the above-described and other methods of the present disclosure may be implemented by application-specific integrated circuits (ASICs), prepared by interconnecting an appropriate network of conventional component circuits, or by a combination thereof with one or more conventional general-purpose microprocessors and/or signal processors programmed accordingly.

Each of the functions of the described embodiments may be implemented by one or more processing circuits or circuitry. Processing circuitry includes a programmed processor, as a processor includes circuitry. A processing circuit also includes devices such as an ASIC, digital signal processor (DSP), field programmable gate array (FPGA), and conventional circuit components arranged to perform the recited functions.

What is claimed is:

1. An image reading device comprising:
an image reader configured to read an image of a document;
a color reference component arranged to face the image reader;
a document conveying portion configured to convey the document to a gap between the image reader and the color reference component; and
processing circuitry configured to
cause the image reader to read the color reference component at a prescribed timing to obtain color reference image data,
generate correction data based on the color reference image data, the correction data being data for correcting data of the image read by the image reader,
move the color reference component relative to the image reader in a direction orthogonal to a direction toward and away from the image reader, and
move the color reference component relative to the image reader in a direction orthogonal to a direction in which the document is conveyed through the gap between the image reader and the color reference component.

2. The image reading device according to claim 1, wherein the color reference image data includes a plurality of items of color reference image data, and
wherein the processing circuitry is configured to generate the correction data based on the plurality of items of the color reference image data.

3. The image reading device according to claim 1, wherein the processing circuitry is configured to
begin generating the correction data in response to a rear end of the document in a conveyance direction passing through the gap between the color reference component and the image reader, and
stop generating the correction data before a front end of a next document in the conveyance direction reaches the gap between the color reference component and the image reader.

4. The image reading device according to claim 1, further comprising
wherein the color reference component is a plate-like component detachable from the image reader, and
wherein the color reference component is configured to guide the document such that the document conveyed to the gap between the image reader and the color reference component passes through the gap at a prescribed distance from the image reader.

5. The image reading device according to claim 4, further comprising:
an entrance guide configured to guide the document to the gap between the image reader and the color reference component; and
an exit guide configured to guide the document passed through the image reader,
wherein the color reference component has an upstream portion in a conveyance direction of the document, and the upstream portion of the color reference component overlaps with the entrance guide, and
wherein the color reference component has a downstream portion in the conveyance direction of the document, and the downstream portion of the color reference component overlaps with the exit guide.

6. The image reading device according to claim 4, further comprising
a pressurizer configured to pressurize the color reference component toward the image reader,
wherein the pressurizer has pressing force configured to cause the color reference component to retract in a direction away from the image reader due to a pressing force of a thin paper document conveyed to the gap between the color reference component and the image reader.

7. The image reading device according to claim 4, further comprising
a regulatory mechanism configured to control movement of the color reference component in a direction separating from the image reader,
wherein the regulatory mechanism is configured to be switchable between a control state in which the movement of the color reference component in the direction separating from the image reader is controlled and an allowed state in which the movement of the color reference component in the direction separating from the image reader is allowed.

8. The image reading device according to claim 7, further comprising a thickness data sensor configured to obtain thickness data of the document,
wherein the processing circuitry is configured to determine whether or not to restrict the movement of the color reference component in the direction separating from the image reader, based on the thickness data.

9. The image reading device according to claim 4, further comprising a regulatory mechanism configured to
control movement of the color reference component in a direction separating from the image reader, and
change a position at which movement of the color reference component is restricted.

10. The image reading device according to claim 9, further comprising
a thickness data sensor configured to obtain thickness data of the document,
wherein the processing circuitry is configured to change the position at which the movement of the color reference component is restricted based on the thickness data.

11. The image reading device according to claim 7,
wherein the regulatory mechanism is configured to restrict the movement of the color reference component in the direction separating from the image reader in response to a front end of the document passing through the gap between the color reference component and the image reader.

12. The image reading device according to claim 1, further comprising
a spacer configured to form a gap between the color reference component and the image reader, outside a document conveying area of the color reference component or outside a document conveying area of the color reference component of the image reader,
wherein the spacer is rotatable.

13. The image reading device according to claim 12, further comprising
a counterpart member of the spacer,
wherein the counterpart member includes a contact portion, and the contact portion is made of an elastic member.

14. An image forming apparatus comprising
an image reading device comprising:
an image reader configured to read an image of a document;
a color reference component arranged to face the image reader;
a document conveying portion configured to convey the document to a gap between the image reader and the color reference component; and
processing circuitry configured to
cause the image reader to read the color reference component at a prescribed timing to obtain color reference image data,
generate correction data based on the color reference image data, the correction data being data for correcting data of the image read by the image reader,
move the color reference component relative to the image reader in a direction orthogonal to a direction toward and away from the image reader,
move the color reference component relative to the image reader in a direction orthogonal to a direction in which the document is conveyed through the gap between the image reader and the color reference component, and
form an image on a recording material based on data of the image read by the image reading device.

15. The image reading device according to claim 1, wherein the color reference component includes a first face parallel to a surface of the image reader and a second face extending upstream from an upstream end of the first face in a document conveyance direction.

16. The image reading device according to claim 1, wherein the image reader includes a top image reader and a bottom image reader, and
wherein the color reference component is below the bottom image reader.

17. The image forming apparatus of claim 14, wherein the color reference component includes a first face parallel to a surface of the image reader and a second face extending upstream from an upstream end of the first face in a document conveyance direction.

18. The image forming apparatus of claim 14, wherein the image reader includes a top image reader and a bottom image reader, and
wherein the color reference component is below the bottom image reader.

19. The image reading device according to claim 1, wherein the direction orthogonal to a direction toward and away from the image reader is parallel to a main scanning direction.

20. An image reading device comprising:
an image reader configured to read an image of a document;
a color reference component arranged to face the image reader, the color reference component being a plate-like component detachable from the image reader;
a document conveying portion configured to convey the document to a gap between the image reader and the color reference component; and
processing circuitry configured to
cause the image reader to read the color reference component at a prescribed timing to obtain color reference image data,
generate correction data based on the color reference image data, the correction data being data for correcting data of the image read by the image reader, and
move the color reference component relative to the image reader in a direction orthogonal to a direction toward and away from the image reader,
wherein the color reference component is configured to guide the document such that the document conveyed to the gap between the image reader and the color reference component passes through the gap at a prescribed distance from the image reader.

* * * * *